(12) United States Patent
Choi et al.

(10) Patent No.: US 10,728,846 B2
(45) Date of Patent: Jul. 28, 2020

(54) RANDOM ACCESS OF STATION OPERATING IN WIRELESS LAN SYSTEM

(71) Applicant: LG ELECTRONICS INC., Seoul (KR)

(72) Inventors: Hyeyoung Choi, Seoul (KR); Kiseon Ryu, Seoul (KR); Jeongki Kim, Seoul (KR); Hangyu Cho, Seoul (KR); Suhwook Kim, Seoul (KR); Hyunhee Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/560,092

(22) PCT Filed: Jul. 1, 2016

(86) PCT No.: PCT/KR2016/007103
§ 371 (c)(1),
(2) Date: Sep. 20, 2017

(87) PCT Pub. No.: WO2017/007180
PCT Pub. Date: Jan. 12, 2017

(65) Prior Publication Data
US 2018/0092032 A1 Mar. 29, 2018

Related U.S. Application Data

(60) Provisional application No. 62/190,714, filed on Jul. 9, 2015, provisional application No. 62/190,757, filed (Continued)

(51) Int. Cl.
*H04W 52/02* (2009.01)
*H04W 74/00* (2009.01)
(Continued)

(52) U.S. Cl.
CPC ....... *H04W 52/0216* (2013.01); *H04L 5/0007* (2013.01); *H04L 5/0053* (2013.01);
(Continued)

(58) Field of Classification Search
CPC .......... H04W 52/0216; H04W 74/006; H04W 74/0833; H04W 74/085; H04W 84/12;
(Continued)

(56) References Cited

U.S. PATENT DOCUMENTS

2010/0195664 A1    8/2010  Ho
2013/0058268 A1 *  3/2013  Kholaif ............... H04W 74/085
                                              370/311

(Continued)

FOREIGN PATENT DOCUMENTS

EP        3163783        5/2017
WO      2012150809      11/2012
(Continued)

OTHER PUBLICATIONS

European Patent Office Application Serial No. 16821586.1, Search Report dated Jan. 14, 2019, 10 pages.
(Continued)

*Primary Examiner* — Christopher R Crompton
(74) *Attorney, Agent, or Firm* — Lee Hong Degerman Kang Waimey

(57) ABSTRACT

A method for performing uplink Orthogonal Frequency Division Multiple Access (UL OFDMA) based random access to an Access Point (AP) by a Station (STA) in a Wireless Local Area Network (WLAN) system is proposed. For the purpose, the STA sets a random value within an OFDMA Contention Window (CWO) as an OFDMA Back-Off (OBO) value, receives a beacon frame from the AP, the beacon frame including transmission start time information of one or more Trigger Frames for Random Access (TF-Rs),
(Continued)

decrements the OBO value based on reception of the one or more TF-Rs, and if the OBO value reaches 0, transmits a random access request frame in resources selected randomly from among resources allocated to the STA.

4 Claims, 24 Drawing Sheets

Related U.S. Application Data on Jul. 10, 2015, provisional application No. 62/192,040, filed on Jul. 13, 2015, provisional application No. 62/192,049, filed on Jul. 13, 2015, provisional application No. 62/275,799, filed on Jan. 7, 2016.

(51) Int. Cl.
*H04W 74/08* (2009.01)
*H04W 84/12* (2009.01)
*H04L 5/00* (2006.01)
*H04L 27/26* (2006.01)

(52) U.S. Cl.
CPC ........... *H04L 27/26* (2013.01); *H04W 74/006* (2013.01); *H04W 74/085* (2013.01); *H04W 74/0833* (2013.01); *H04L 5/0048* (2013.01); *H04L 27/2613* (2013.01); *H04W 84/12* (2013.01); *Y02D 70/00* (2018.01); *Y02D 70/10* (2018.01); *Y02D 70/1262* (2018.01); *Y02D 70/14* (2018.01); *Y02D 70/142* (2018.01); *Y02D 70/22* (2018.01)

(58) Field of Classification Search
CPC ..... H04L 5/0048; H04L 5/0053; H04L 27/26; H04L 27/2613

USPC ........................................................ 370/311
See application file for complete search history.

(56) References Cited

U.S. PATENT DOCUMENTS

| 2016/0227565 | A1* | 8/2016 | Ghosh ............... H04W 72/1268 |
| 2016/0227579 | A1* | 8/2016 | Stacey ............. H04W 74/0833 |
| 2016/0262185 | A1* | 9/2016 | Ghosh ................... H04W 72/04 |
| 2016/0269993 | A1* | 9/2016 | Ghosh ............... H04W 52/0229 |
| 2016/0302232 | A1* | 10/2016 | Ghosh ............... H04W 74/0833 |
| 2016/0353434 | A1* | 12/2016 | Ghosh ............... H04W 72/0446 |
| 2018/0014334 | A1* | 1/2018 | Ahn ...................... H04W 28/02 |
| 2018/0084575 | A1* | 3/2018 | Ghosh ................ H04W 74/004 |
| 2018/0084605 | A1* | 3/2018 | Li ......................... H04W 84/12 |
| 2018/0184425 | A1* | 6/2018 | Ghosh ............... H04W 72/0446 |
| 2019/0044586 | A1* | 2/2019 | Seok .................... H04B 7/0452 |

FOREIGN PATENT DOCUMENTS

| WO | 2014061992 | 4/2014 |
| WO | 2013191448 | 12/2014 |
| WO | 2015020377 | 2/2015 |
| WO | 2016126370 | 8/2016 |

OTHER PUBLICATIONS

Ghosh, C. et al., "Random Access with Trigger Frames using OFDMA", doc.: IEEE 802.11-15/0604r0, XP068094472, May 2015, 16 pages.
Fang, Y. et al., "TGax D0.1 Comment Resolution for CID 2383", doc.: IEEE 802.11-16/0675r0, XP068119568, May 2016, 3 pages.
Khorov, E. et al., "Considerations on Trigger Frame for Random Access Procedure", doc.: IEEE 802.11-16/0399r1, XP068105307, Mar. 2016, 11 pages.

* cited by examiner

FIG. 6
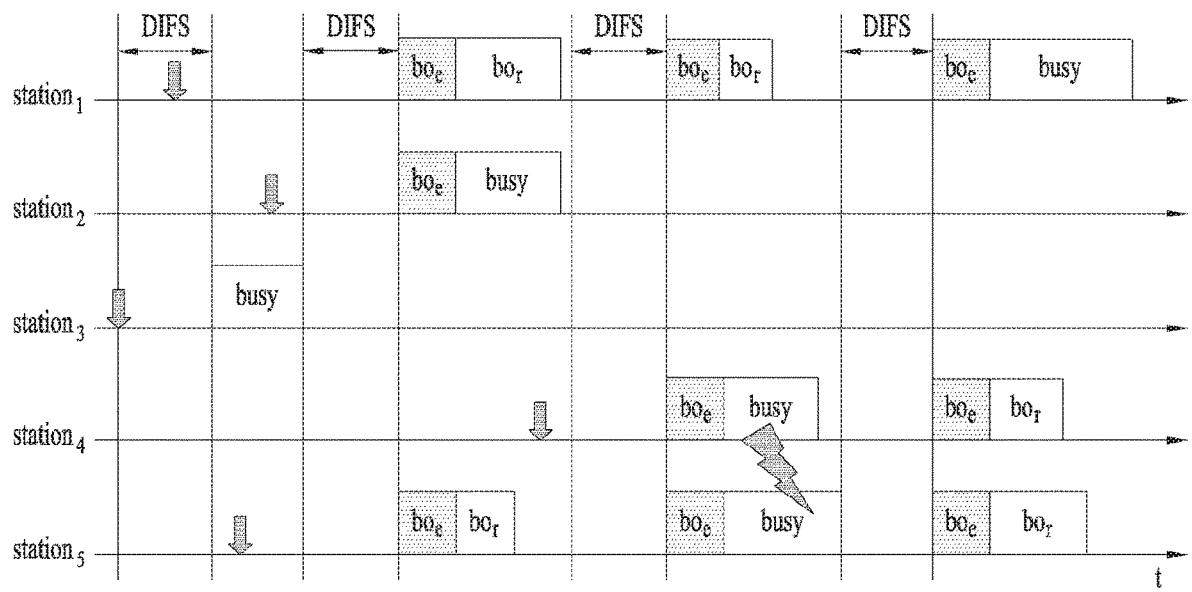
| busy | Occupied medium | 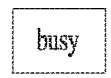 | Elapsed backoff time |
|  | Packet reaches MAC |  | Residual baoff time |
FIG. 7
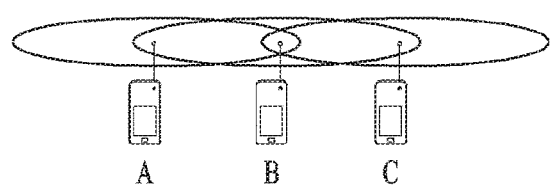

FIG. 14
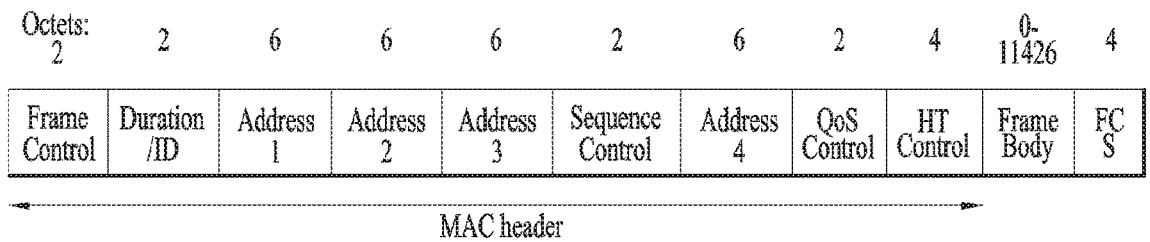
FIG. 15
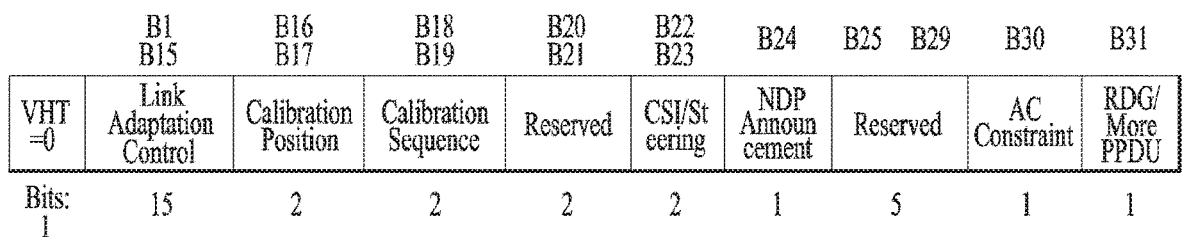
(a)
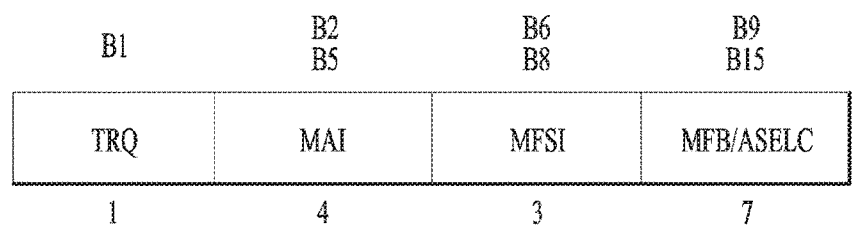
(b)

FIG. 16

| | B1 | B2 | B3 B5 | B6 B8 | B9 B23 | B24 B26 | B27 | B28 | B29 | B30 | B31 |
|---|---|---|---|---|---|---|---|---|---|---|---|
| VHT=1 | Reserved | MRQ | MSI | MFSI/ GID-L | MFB | GID-H | Coding Type | FB Tx Type | Unsoli cited MFB | AC Constraint | RDG/ More PPDU |
| Bits: 1 | 1 | 1 | 3 | 3 | 15 | 3 | 1 | 1 | 1 | 1 | 1 |

(a)

| B9 B11 | B12 B15 | B16 B17 | B16 B23 |
|---|---|---|---|
| VHT N_STS | MCS | BW | SNR |
| 3 | 4 | 2 | 6 |

(b)

RANDOM ACCESS OF STATION OPERATING IN WIRELESS LAN SYSTEM

CROSS-REFERENCE TO RELATED APPLICATIONS

This application is the National Stage filing under 35 U.S.C. 371 of International Application No. PCT/KR2016/007103, filed on Jul. 1, 2016, which claims the benefit of U.S. Provisional Application No. 62/190,714, filed on Jul. 9, 2015, 62/190,757, filed on Jul. 10, 2015, 62/192,040, filed on Jul. 13, 2015, 62/192,049, filed on Jul. 13, 2015 and 62/275,799, filed on Jan. 7, 2016, the contents of which are all hereby incorporated by reference herein in their entirety.

TECHNICAL FIELD

The present invention relates to a Wireless Local Area Network (WLAN) system, and more particularly, to a method and apparatus for efficiently performing random access to an Access Point (AP) by a Station (STA) in a WLAN system.

BACKGROUND ART

While a proposed random access method as set forth below is applicable to various types of wireless communication, the random access method will be described below in the context of a WLAN system as an example of a system to which the present invention is applicable.

Standards for a WLAN technology have been developed as Institute of Electrical and Electronics Engineers (IEEE) 802.11 standards. IEEE 802.11a and 802.11b use an unlicensed band at 2.4 GHz or 5 GHz. IEEE 802.11b provides a transmission rate of 11 Mbps, and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output-OFDM (MIMO-OFDM). IEEE 802.11n supports a channel bandwidth of up to 40 MHz and, in this case, provides a transmission rate of 600 Mbps.

The above-described WLAN standards have evolved into IEEE 802.11ac that supports a transmission rate of up to 1 Gbit/s by using a bandwidth of up to 160 MHz and supporting eight spatial streams, and IEEE 802.11ax standardization is under discussion.

DISCLOSURE

Technical Problem

An object of the present invention is to provide an efficient random access method and a method for efficiently transmitting and receiving data using the random access method, in a Wireless Local Area Network (WLAN) system.

The present invention is not limited to the above object, and other objects of the present invention will be apparent from the embodiments of the present invention.

Technical Solution

In one aspect of the present invention, a method for performing uplink Orthogonal Frequency Division Multiple Access (UL OFDMA) based random access to an Access Point (AP) by a Station (STA) in a Wireless Local Area Network (WLAN) system includes setting a random value within an OFDMA Contention Window (CWO) as an OFDMA Back-Off (OBO) value, receiving a beacon frame from the AP, the beacon frame including transmission start time information of one or more Trigger Frames for Random Access (TF-Rs), decrementing the OBO value based on reception of the one or more TF-Rs, and if the OBO value reaches 0, transmitting a random access request frame in a resource selected randomly from among resources allocated to the STA.

After receiving the beacon frame, the STA may operate in a doze state until a transmission start time indicated by the transmission start time information of the one or more TF-Rs.

When the STA receives a specific TF-R among the one or more TF-Rs, the STA may decrement the OBO value by a value corresponding to the number of random access resource units allocated to the STA by the specific TF-R.

The specific TF-R may allocate a plurality of random access resource units to the STA.

The STA may additionally check information about the number of random access resource units within a beacon interval through the beacon frame, and if the number of random access resource units in the beacon interval is smaller than the OBO value of the STA, the STA may operate in the doze state during the beacon interval. Herein, the STA may reset the OBO value to a value obtained by decrementing the OBO value by a value corresponding to the number of random access resource units in the beacon interval. If the information about the number of random access resource units in the beacon interval of the beacon frame has a specific value, the STA may operate, assuming that the AP is not capable of determining the number of random access resource units in the beacon interval.

On the other hand, the STA may additionally check information about the number of random access resource units in the beacon interval through an initial TF-R of the one or more TF-Rs, and if the number of random access resource units in the beacon interval is smaller than the OBO value of the STA, the STA may operate in the doze state during the beacon interval. Herein, the STA may reset the OBO value to a value obtained by decrementing the OBO value by a value corresponding to the number of random access resource units in the beacon interval. If the information about the number of random access resource units in the beacon interval, included in the first of the one or more TF-Rs has a specific value, the STA may operate, assuming that the AP is not capable of determining the number of random access resource units in the beacon interval. Each of the one or more TF-Rs may include a 1-bit cascade indicator indicating whether the TF-R is cascaded.

If the STA receives a TF-R having a cascade indicator set to 1, the STA may operate in an awake state until receiving a TF-R having a cascade indicator set to 0.

Further, the STA may additionally check information about the number of random access resource units in the beacon interval through an initial TF-R of a plurality of cascaded TF-Rs, and if the number of random access resource units in the beacon interval is smaller than the OBO value of the STA, the STA may operate in the doze state during the beacon interval.

In another aspect of the present invention, an STA for performing random access to an AP based on uplink OFDMA in a WLAN system includes a transceiver configured to transmit and receive wireless signals to and from the AP, and a processor connected to the transceiver and configured to set a random value within a CWO as an OBO value, to receive a beacon frame from the AP, the beacon frame including transmission start time information of one or more TF-Rs, to decrement the OBO value based on reception of the one or more TF-Rs, and if the OBO value reaches 0, to transmit a random access request frame in a resource selected randomly from among resources allocated to the STA.

Upon receipt of a specific TF-R among the one or more TF-Rs, the processor may be configured to decrement the OBO value by a value corresponding to the number of random access resource units allocated to the STA by the specific TF-R.

The specific TF-R may allocate a plurality of random access resource units to the STA.

Each of the one or more TF-Rs may include a 1-bit cascade indicator indicating whether the TF-R is cascaded.

Advantageous Effects

According to an embodiment of the present invention, a Station (STA) can perform random access with a decreased collision probability, while minimizing its power consumption in a Wireless Local Area Network (WLAN) system.

Further, random access resources can be allocated flexibly, using a beacon frame and a Trigger Frame for Random access (TF-R).

The effects of the present invention are not limited to the above-described effects and other effects which are not described herein will be understood by those skilled in the art from the following description of the embodiments of the present invention.

DESCRIPTION OF DRAWINGS

FIGS. 6, 7, and 8 are views illustrating operations of a Station (STA) in response to reception of a Traffic Indication Map (TIM).

FIGS. 14, 15, and 16 are views illustrating a Medium Access Control (MAC) frame format.

BEST MODE

Figure 1:
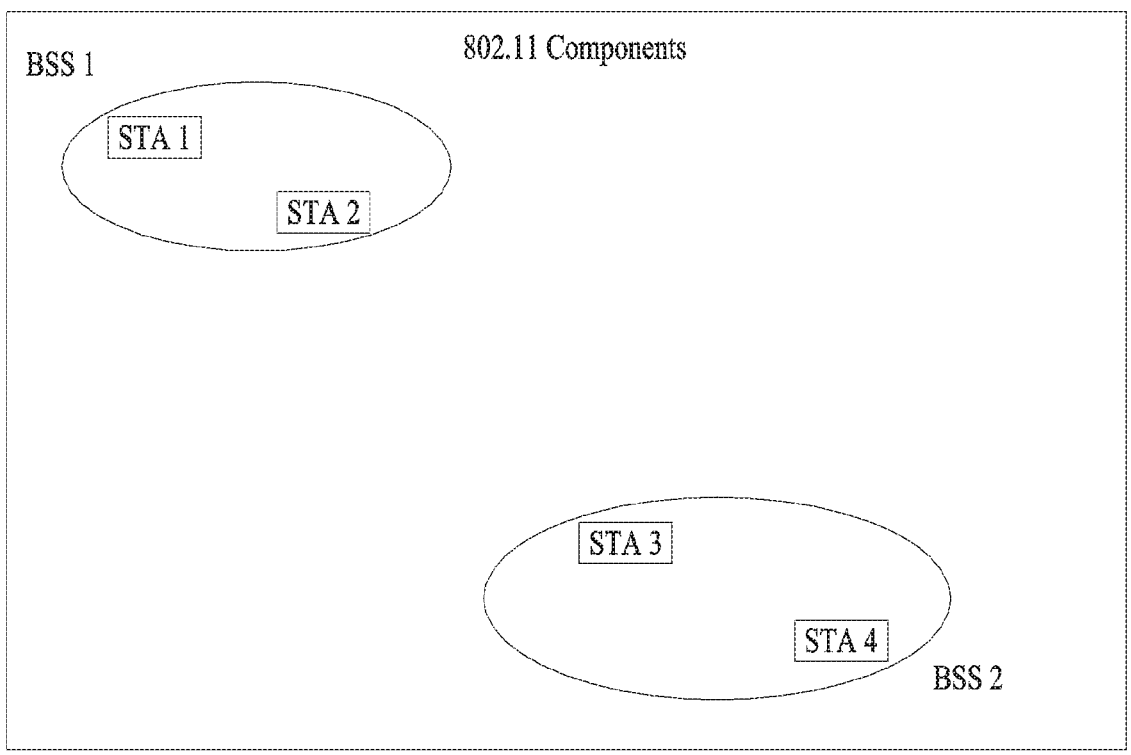
FIG. 1 is a view illustrating an exemplary configuration of a Wireless Local Area Network (WLAN) system.

Reference will now be made in detail to preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be changed. Some constructions or elements of any embodiment may be included in another embodiment, or may be replaced with corresponding constructions or features of another embodiment.

Specific terms as used in the following description are provided to help understanding of the present invention, and these specific terms may be replaced with other terms within the scope and spirit of the present invention.

In some instances, known structures and devices are omitted or are shown in block diagram form, focusing on important features of the structures and devices, so as not to obscure the concept of the present invention. Like reference numerals denote the same components throughout the present disclosure.

The embodiments of the present invention may be supported by standard specifications disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, and a 3GPP2 system. In other words, the steps or parts, which are not described to clearly reveal the technical idea of the present invention, in the embodiments of the present invention may be explained by the above standard specifications. All terms used in the embodiments of the present invention may be explained by the standard specifications.

FIG. 1 is a view illustrating an exemplary configuration of a Wireless Local Area Network (WLAN) system.

As illustrated in FIG. 1, the WLAN system includes at least one Basic Service Set (BSS). The BSS is a set of STAs that are able to communicate with each other through successful acquisition of synchronization.

An STA is a logical entity including a physical layer interface between a Medium Access Control (MAC) layer and a wireless medium. STAs may include an AP and a non-AP STA. Among STAs, a portable terminal manipulated by a user is a non-AP STA. If an STA is simply mentioned, the STA refers to a non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

An AP is an entity that provides access to a Distribution System (DS) to an associated STA through a wireless medium. The AP may also be referred to as a centralized controller, a Base Station (BS), a Node-B, a Base Transceiver System (BTS), or a site controller.

BSSs may be classified into infrastructure BSS and Independent BSS (IBS S).

The BSSs illustrated in FIG. 1 are IBSSs. An IBSS refers to a BSS that does not include an AP. Since the IBSS does not include an AP, the IBSS is not allowed to access the DS and thus forms a self-contained network.

Figure 2:
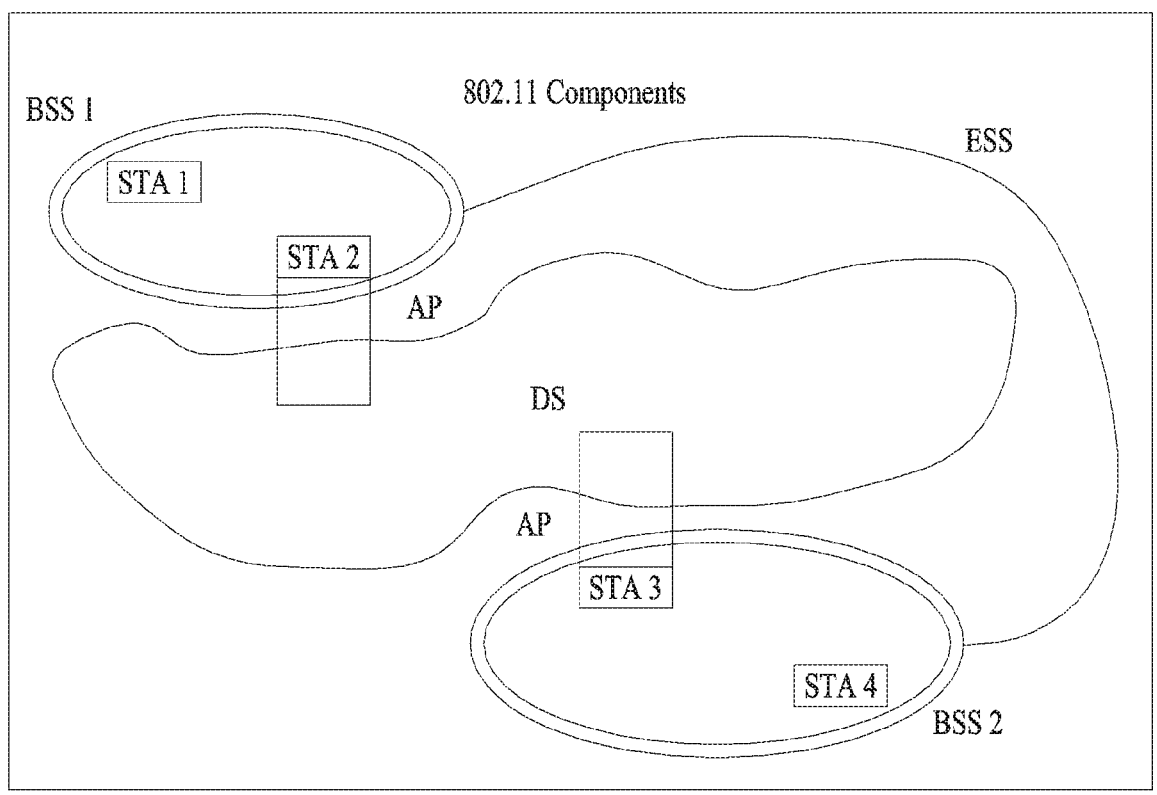
FIG. 2 is a view illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. Although communication between non-AP STAs is basically conducted through an AP in the infrastructure BSS, if a direct link is established between the non-AP STAs, direct communication may be performed between the non-AP STAs.

As illustrated in FIG. 2, a plurality of infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while conducting seamless communication.

The DS is a mechanism that connects a plurality of APs to one another. The DS is not necessarily a network. As long as it provides a specific distribution service, the DS is not limited to any specific type. For example, the DS may be a wireless network such as a mesh network, or a physical structure that connects APs to one another.

Figure 3:
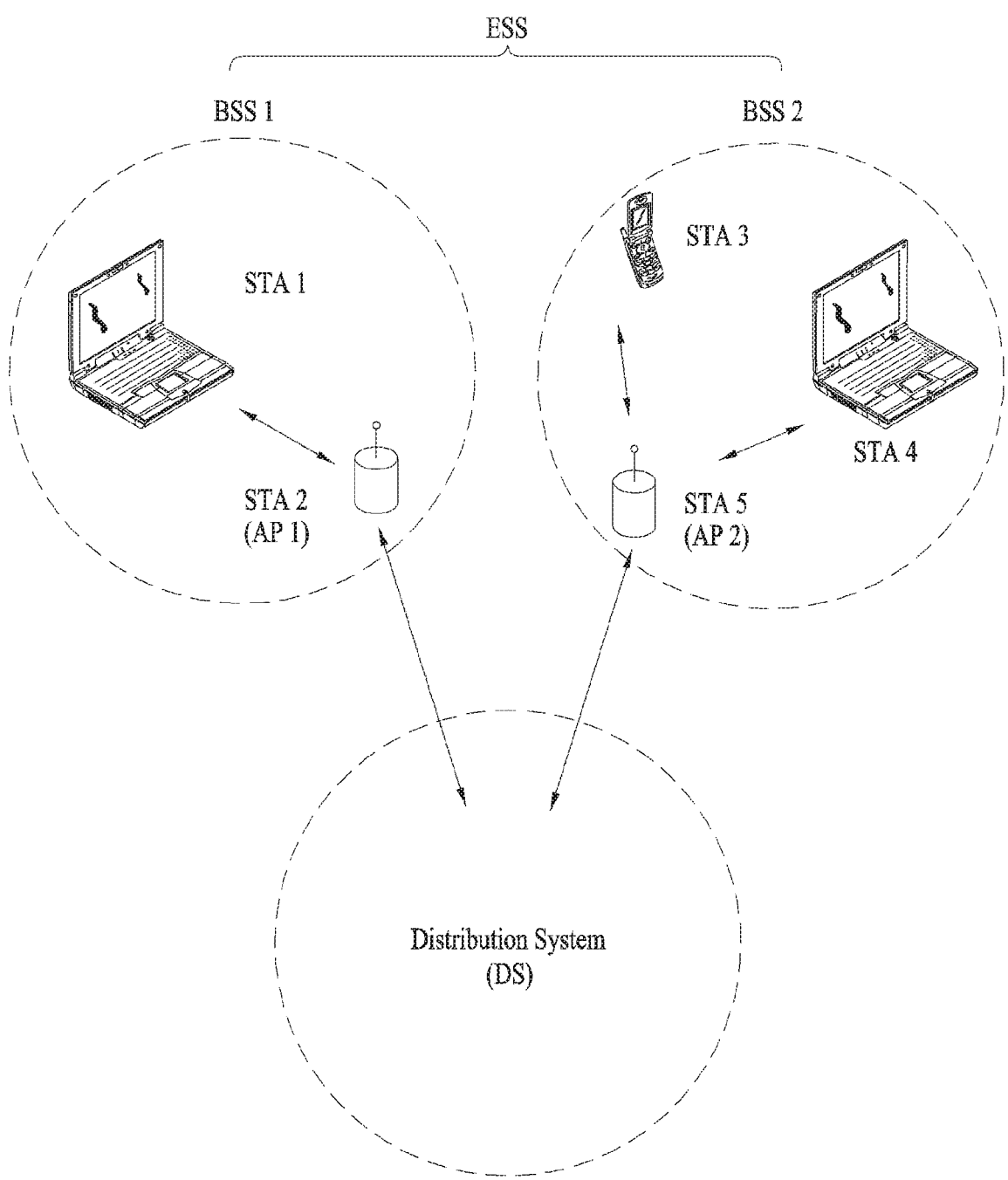
FIG. 3 is a view illustrating an exemplary structure of a WLAN system.

FIG. 3 is a view illustrating an exemplary structure of a WLAN system. In FIG. 3, an exemplary infrastructure BSS including a DS is illustrated.

In the example of FIG. 3, a first BSS (BSS 1) and a second BSS (BSS 2) form an ESS. An STA is a device operating in conformance to the Medium Access Control/Physical (MAC/PHY) regulations of IEEE 802.11 in the WLAN system. STAs include an AP STA and a non-AP STA. The non-AP STA is a device typically manipulated directly by a user, like a mobile phone. In the example of FIG. 3, STA 1, STA 3, and STA 4 are non-AP STAs, and STA 2 and STA 5 are AP STAs.

In the following description, the term non-AP STA is interchangeably used with terminal, WTRU, UE, MS, Mobile Subscriber Station (MSS), or the like. An AP conceptually corresponds to a BS, a Node-B, an evolved No-B (eNB), a BTS, a femto BS, and so on in other wireless communication fields.

Figure 4:
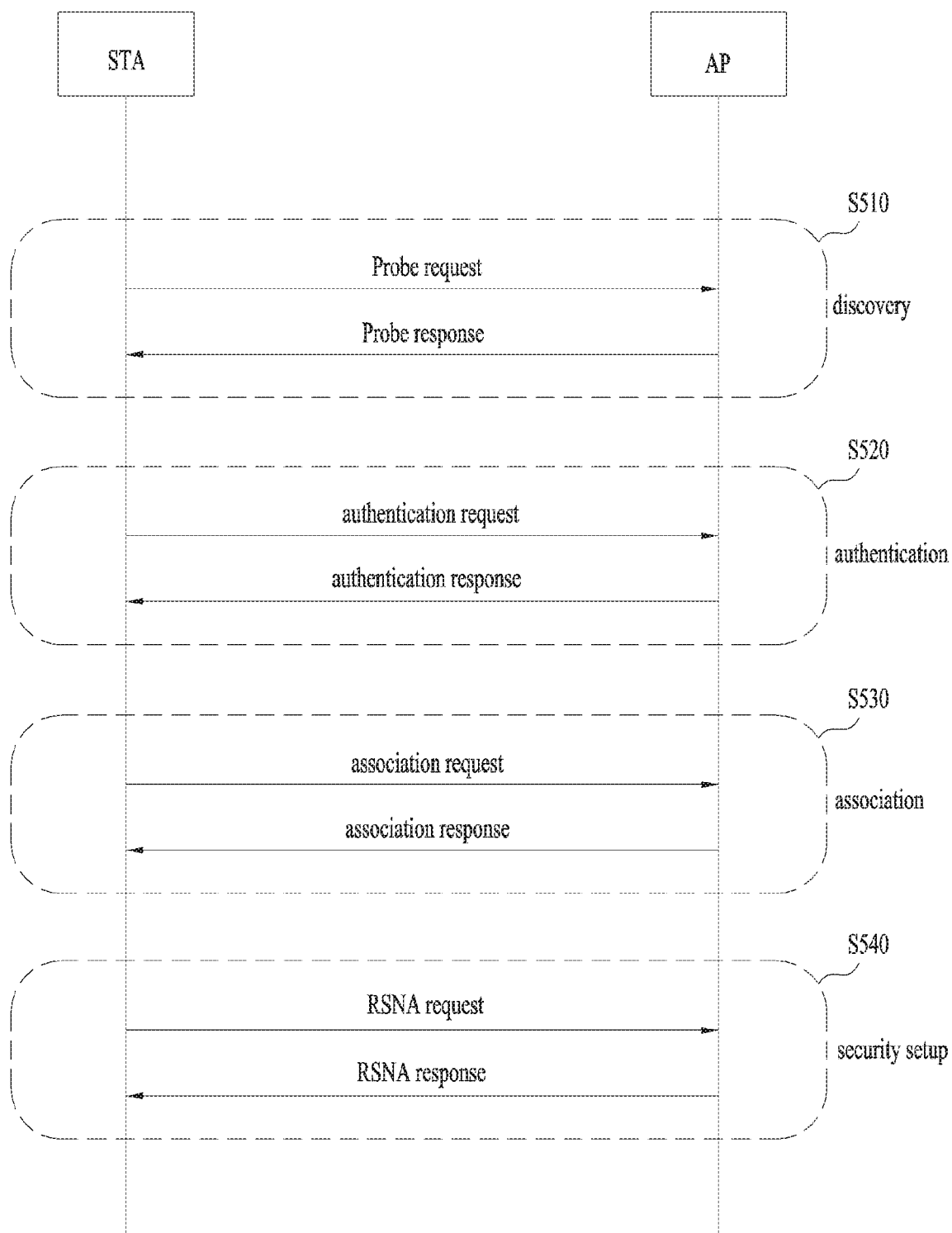
FIG. 4 is a diagram illustrating a signal flow for a general link setup procedure.
Figure 5:
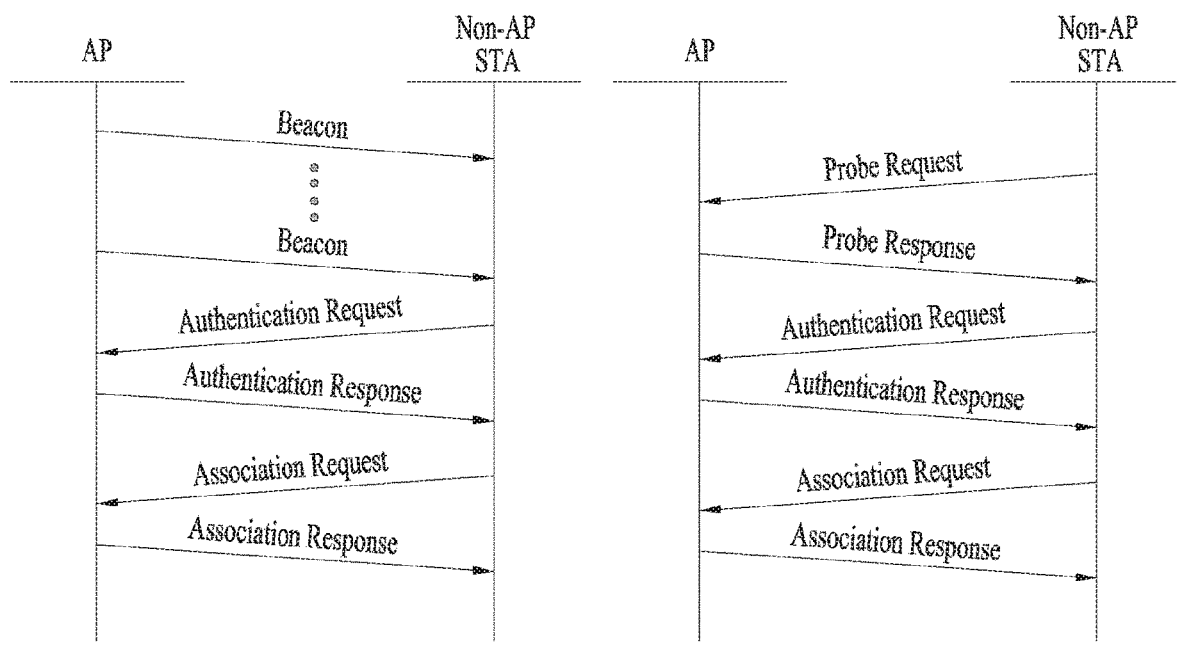
FIG. 5 is a diagram illustrating signal flows for an active scanning method and a passive scanning method.

FIG. 4 is a diagram illustrating a signal flow for a general link setup procedure, and FIG. 5 is a diagram illustrating signal flows for an active scanning method and a passive scanning method.

In order to set up a link with a network and transmit/receive data to/from the network, the STA should perform network discovery, authentication, association, and authentication for security. The link setup procedure may also be referred to as a session initiation procedure or a session setup procedure. In addition, discovery, authentication, association, and security setup steps of the link setup procedure may collectively be referred to as an association procedure.

An exemplary link setup procedure will be described with reference to FIG. 4.

In step S410, the STA may perform network discovery. The network discovery may include scanning of the STA. That is, the STA should search for an available network so as to access the network. The STA should identify a compatible network before joining in a wireless network. The process of identifying a network in a specific region is referred to as scanning.

Scanning is classified into active scanning and passive scanning. While FIG. 4 illustrates a network discovery operation including active scanning, the network discovery operation may involve passive scanning.

In the case of active scanning, a scanning STA transmits a probe request frame and waits for a response to the probe request frame, while switching channels one after another in order to discover an AP around the STA. A responder transmits a probe response frame as a response to the probe request frame to the STA that has transmitted the probe request frame. The responder may be the last STA that has transmitted a beacon frame in a BSS of a scanned channel. In a BSS, since an AP transmits a beacon frame, the AP is a responder, whereas in an IBSS, since STAs of the IBSS sequentially transmit beacon frames, the responder is not constant. For example, if an STA transmits a probe request frame on channel 1 and receives a probe response frame on channel 1, the STA may store BSS information included in the received probe response frame, move to the next channel (for example, channel 2), and perform scanning on the next channel in the same manner (i.e., probe request/response transmission/reception on channel 2).

Referring to FIG. 5, the scanning operation may also be carried out by passive scanning. An STA that performs passive scanning waits for a beacon frame, while switching channels one after another. The beacon frame is one of management frames in IEEE 802.11, which is periodically transmitted to indicate the presence of a wireless network, and enable the scanning STA to search for the wireless network and join in the wireless network. In a BSS, an AP periodically transmits a beacon frame, whereas in an IBSS, STAs of the IBSS sequentially transmit beacon frames. Upon receipt of a beacon frame during scanning, an STA stores BSS information included in the beacon frame, switches to another channel, and records beacon frame information for each channel. Upon receipt of a beacon frame during scanning, an STA stores BSS information included in the received beacon frame, switches to the next channel, and performs scanning on the next channel in the same manner.

A comparison between active scanning and passive scanning reveals that active scanning advantageously has a shorter delay and less power consumption than passive scanning.

After the STA discovers the network, the STA may perform an authentication procedure in step S520. The authentication procedure may be referred to as a first authentication procedure to clearly distinguish the authentication procedure from a security setup procedure of step S540.

The authentication procedure may include transmission of an authentication request frame to an AP by the STA, and transmission of an authentication response frame to the STA by the AP in response to the authentication request frame. The authentication frame used for an authentication request/response may be a management frame.

The authentication frame may include information about an authentication algorithm number, an authentication transaction sequence number, a status code, challenge text, a Robust Security Network (RSN), a Finite Cyclic Group (FCG), and so on. The above-mentioned information may be an example of part of information that may be included in the authentication request/response frame, and may be replaced with other information or include additional information.

The STA may transmit the authentication request frame to the AP. The AP may determine whether to authenticate the STA based on information included in the received authentication request frame. The AP may provide the result of the authentication to the STA in the authentication response frame.

After the STA is successfully authenticated, the association procedure may be carried out in step S530. The association procedure may involve transmitting an association request frame to the AP by the STA, and transmitting an association response frame to the STA by the AP in response to the association request frame.

For example, the association request frame may include information about various capabilities, a beacon listen interval, a Service Set Identifier (SSID), supported rates, supported channels, an RSN, a mobility domain, supported operating classes, a Traffic Indication Map (TIM) broadcast request, interworking service capability, and so on.

For example, the association response frame may include information about various capabilities, a status code, an Association ID (AID), supported rates, an Enhanced Distributed Channel Access (EDCA) parameter set, a Received Channel Power Indicator (RCPI), a Received Signal to Noise Indicator (RSNI), a mobility domain, a timeout interval (association comeback time), an overlapping BSS scan parameter, a TIM broadcast response, a Quality of Service (QoS) map, and so on.

The above-mentioned information may be an example of part of information that may be included in the association request/response frame, and may be replaced with other information or include additional information.

After the STA is successfully associated with the network, a security setup procedure may be carried out in step S540. The security setup procedure of step S540 may be referred to as an authentication procedure based on a Robust Security Network Association (RSNA) request/response. The authentication procedure of step S520 may be referred to as the first authentication procedure, and the security setup procedure of step S540 may also be simply referred to as an authentication procedure.

For example, the security setup procedure of step S540 may include, for example, a private key setup procedure through 4-way handshaking based on an Extensible Authentication Protocol over LAN (EAPOL) frame. In addition, the security setup procedure may also be carried out in a security scheme that has not been defined in the IEEE 802.11 standards.

Figure 8:
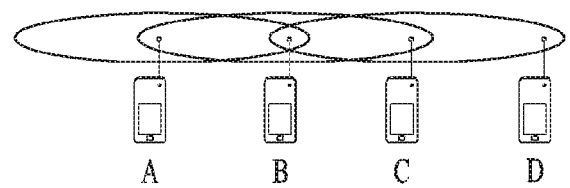
Figure 9:
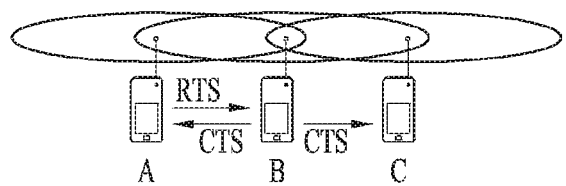
FIGS. 9 to 13 are views illustrating exemplary frame structures in an Institute of Electrical and Electronics Engineers (IEEE) 802.11 system.

FIGS. 6, 7, and 8 are diagrams depicting an operation of an STA in response to reception of a TIM.

Referring to FIG. 6, the STA may transition from a sleep state to an awake state in order to receive a beacon frame including a TIM from an AP, and may determine the presence of buffered traffic to be transmitted to the STA by interpreting a received TIM element. After contending with other STAs to gain medium access for transmission of a Power Save-Poll (PS-Poll) frame, the STA may transmit the PS-Poll frame to the AP to request transmission of a data frame. Upon receipt of the PS-Poll frame from the STA, the AP may transmit a data frame to the STA. The STA may receive the data frame and transmit an ACKnowledgement (ACK) frame for the received data frame to the AP. Then, the STA may return to the sleep state.

As illustrated in FIG. 6, the AP may transmit the data frame a predetermined time (e.g., a Short Inter-Frame Space (SIFS)) after receiving the PS-Poll frame from the STA, that is, the AP may operate in an immediate response scheme. On the other hand, if the AP does not prepare the data frame to be transmitted to the STA during the SIFS after receiving the PS-Poll frame from the STA, the AP may operate in a deferred response scheme, which will be described with reference to FIG. 7.

In the example of FIG. 7, the STA transitions from the sleep state to the awake state, receives a TIM from the AP, and transmits a PS-Poll frame to the AP after contention in the same manner as in the example of FIG. 6. If the AP does not prepare a data frame during an SIFS in spite of reception of the PS-Poll frame, the AP may transmit an ACK frame to the STA, instead of the data frame. If the AP prepares a data frame after transmitting the ACK frame, the AP may transmit the data frame to the STA after contention. The STA may transmit an ACK frame indicating successful reception of the data frame to the AP, and then transition to the sleep state.

FIG. 8 is a view illustrating exemplary transmission of a Delivery TIM (DTIM) from an AP. STAs may transition from the sleep state to the awake state to receive a beacon frame including a DTIM element from the AP. The STAs may determine from the received DTIM that a multicast/broadcast frame will be transmitted. After transmitting the beacon frame including the DTIM, the AP may transmit data (i.e., the multicast/broadcast frame) immediately without transmitting/receiving a PS-Poll frame. The STAs may receive data, maintaining the awake state after receiving the beacon frame including the DTIM, and return to the sleep state, after completion of the data reception.

FIGS. 9 to 13 are views illustrating exemplary frame structures in an IEEE 802.11 system.

An STA may receive a Physical Layer Convergence Protocol (PLCP) Packet Data Unit (PPDU). A PPDU frame format may include Short Training Field (STF), Long Training Field (LTF), SIGNAL (SIG), and Data. For example, a PPDU format may be configured according to the type of the PPDU frame format.

For example, a non-High Throughput (non-HT) PPDU frame format may include only Legacy-STF (L-STF), Legacy-LTF (L-LTF), SIG, and Data.

The type of a PPDU frame format be one of HT-mixed format PPDU and HT-greenfield format PPDU. An additional STF, LTF, and SIG field (or an STF, an LTF, and a SIG field of a different type) may be included between the SIG field and the Data field in the above-described PPDU formats.

Figure 10:
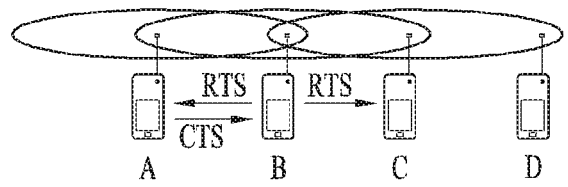

Referring to FIG. 10, a Very High Throughput (VHT) PPDU format may be configured. An additional STF, LTF, and SIG field (or an STF, LTF, and SIG field of a different type) may also be included between the SIG field and the Data field in the VHT PPDU format. More specifically, at least one of VHT-SIG-A, VHT-STF, VHT-LTF, and VHT-SIG-B may be included between the L-SIG field and the Data field in the VHT PPDU format.

STF may be a signal used for Automatic Gain Control (AGC), diversity selection, fine time synchronization, and so on. LTF may be a signal used for channel estimation, frequency error estimation, and so on. STF and LTF may be collectively called a PLCP preamble, and the PLCP preamble may be a signal used for synchronization and channel estimation at an OFDM physical layer.

Figure 11:
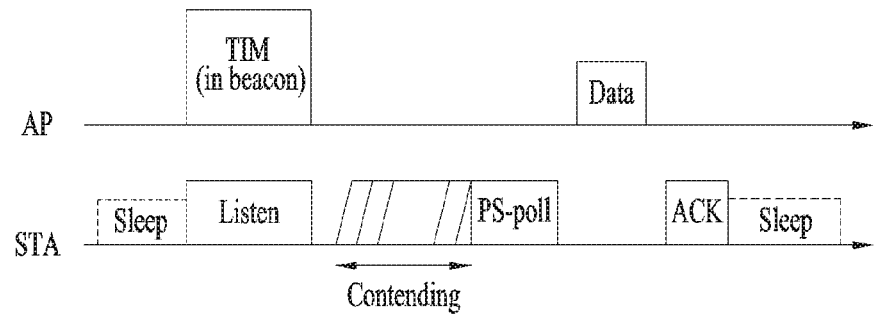

Referring to FIG. 11, the SIG field may include RATE and LENGTH. The RATE field may include information about modulation and a coding rate of data, and the LENGTH field may include information about the length of the data. Additionally, the SIG field may include a parity bit, SIG TAIL bits, and so on.

The Data field may include a SERVICE field, a PLCP Service Data Unit (PSDU), and PPDU TAIL bits. When needed, the Data field may further include padding bits.

Figure 12:
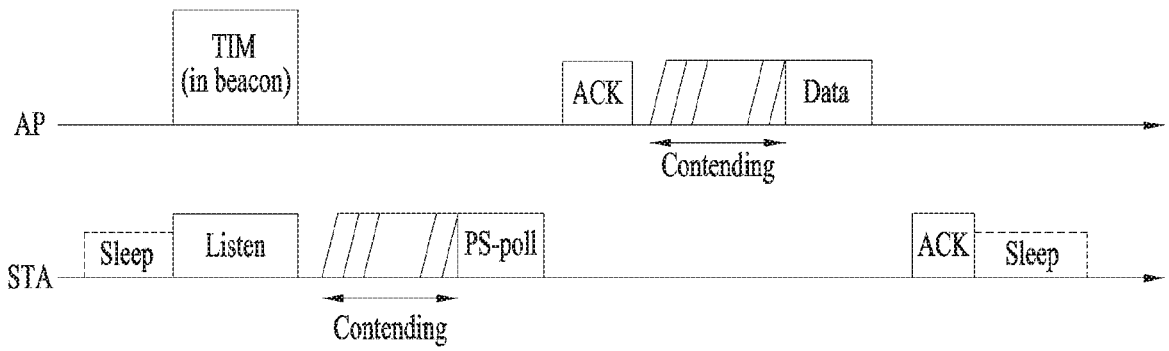

Referring to FIG. 12, a part of the bits of the SERVICE field may be used for synchronization of a descrambler in a receiver, and another part of the bits of the SERVICE field may be reserved. The PSDU corresponds to a MAC Protocol Data Unit (MAC PDU) defined in the MAC layer, and may include data generated/used in a higher layer. The PPDU TAIL bits may be used to return an encoder to a zero state. The padding bits may be used to match the length of the Data field on a predetermined unit basis.

For example, the VHT PPDU format may include an additional STF, LTF, and SIG field (or an STF, LTF, and SIG field of a different type), as described before. L-STF, L-LTF, and L-SIG of a VHT PPDU may be a non-VHT part, and VHT-SIG-A, VHT-STF, VHT-LTF, and VHT-SIG-B of the VHT PPDU may be a VHT part. In other words, areas for non-VHT fields and VHT fields may be defined separately in the VHT PPDU. For example, VHT-SIG-A may include information used to interpret the VHT PPDU.

Figure 13:
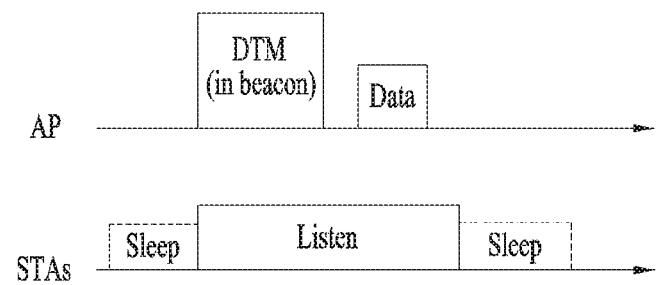

For example, referring to FIG. 13, VHT-SIG-A may include VHT-SIG-A1 ((a) of FIG. 13) and VHT-SIG-2 ((b) of FIG. 13). Each of VHT-SIG-A1 and VHT-SIG-A2 may include 24 data bits, and VHT-SIG-A1 may be transmitted before VHT-SIG-A2. VHT-SIG-A1 may include BandWidth (BW), Space Time Block Coding (STBC), Group ID, Number of Space-Time Streams/Partial Association ID (NSTS/Partial AID), TXOP_PS_NOT_ALLOWED, and Reserved. VHT-SIG-2 may include Short Guard Interval (GI), Short GI NSYM Disambiguation, Single User/Multi-User⌊0⌋ Coding (SU/MU⌊0⌋ Coding), Low Density Parity Check (LDPC) Extra OFDM Symbol, SU VHT-MCS/MU[1-3] Coding, Beamformed, Cyclic Redundancy Check (CRC), Tail, and Reserved. Information about a VHT PPDU may be acquired from these fields.

FIGS. 14, 15, and 16 are views illustrating a MAC frame format.

An STA may receive a PPDU in one of the above-described PPDU formats. A PSDU in a data part of the PPDU frame format may include a MAC PDU. The MAC PDU may be defined in various MAC frame formats, and a basic MAC frame may include a MAC header, Frame Body, and Frame Check Sequence (FCS).

For example, referring to FIG. 14, the MAC header may include Frame Control, Duration/ID, Address, Sequence Control, QoS Control, and HT Control. In the MAC header, the Frame Control field may include control information required for frame transmission/reception. The Duration/ID field may be set to a time required to transmit a frame. The Address fields may include identification information about a transmitter and a receiver, which will be described later. For the Sequence Control, QoS Control, and HT Control fields, refer to the IEEE 802.11 standard specifications.

For example, the HT Control field may be configured in two types, HT variant and VHT variant, and include different information according to the types. Referring to FIGS. 15 and 16, a VHT subfield of the HT Control field may indicate whether the HT Control field is of the HT-variant type or the VHT-variant type. For example, if the VHT subfield is set to '0', the HT Control field may be of the HT-variant type, and if the VHT subfield is set to '1', the HT Control field may be of the VHT-variant type.

For example, referring to FIG. 15, if the HT Control field is of the HT-variant type, the HT Control field may include Link Adaptation Control, Calibration Position, Calibration Sequence, CSI/Steering, HT NDP Announcement, AC constraint, RDG/More PPDU, and Reserved. For example, referring to (b) of FIG. 15, the Link Adaptation Control field may include TRQ, MAI, MFSI, and MFB/ASELC. For more details, refer to the IEEE 802.11 standard specifications.

For example, referring to FIG. 16, if the HT Control field is of the VHT-variant type, the HT Control field may include MRQ, MSI, MFSI/GID-LM, MFB GID-H, Coding Type, FB Tx Type, Unsolicited MFB, AC constraint, RDG/More PPDU, and Reserved. For example, referring to (b) of FIG. 16, the MFB field may include VHT N_STS, MCS, BW, and SNR.

Figure 17:
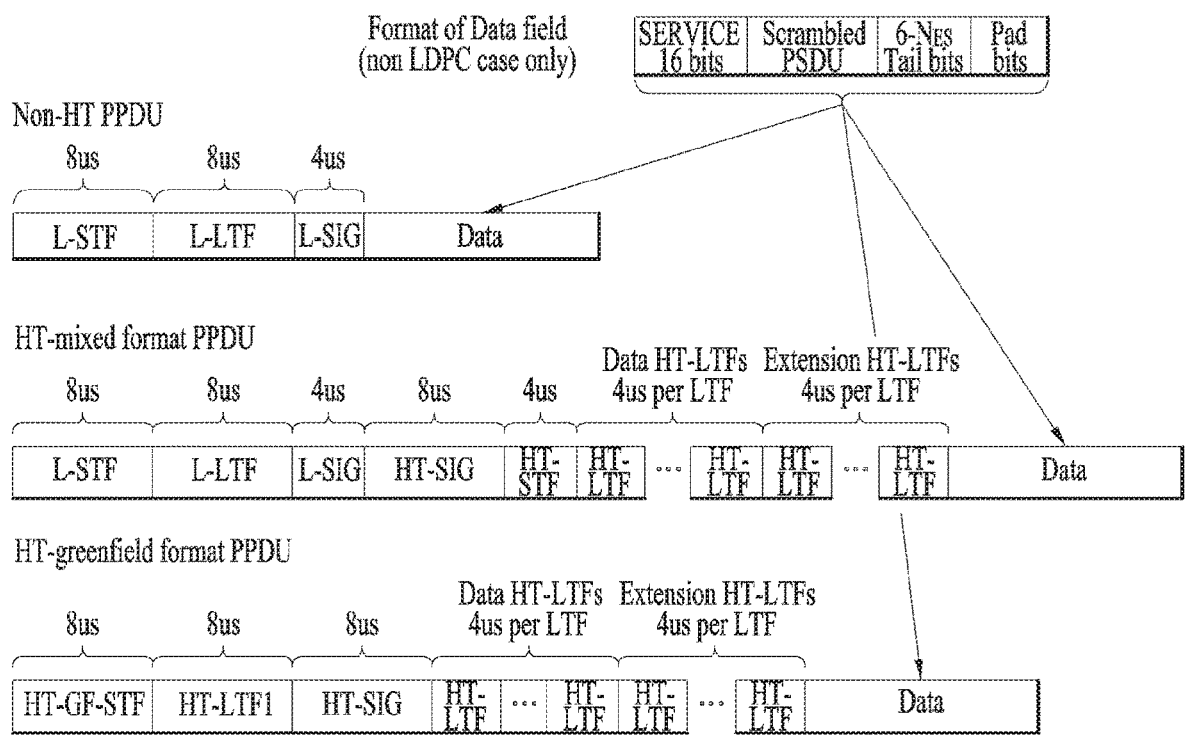
FIG. 17 is a view illustrating a Short MAC frame format.

FIG. 17 is a diagram illustrating a Short MAC frame format. A MAC frame may be configured as a Short MAC frame by reducing unnecessary information when needed, to prevent waste of radio resources. For example, referring to FIG. 17, the MAC header of a Short MAC frame may always include a Frame Control field, an A1 field, and an A2 field. The MAC header may selectively include a Sequence Control field, an A3 field, and an A4 field. Since information unnecessary for a MAC frame is not included in a Short MAC frame in this manner, radio resources may be conserved.

For example, the Frame Control field of the MAC header may include Protocol Version, Type, PTID/Subtype, From DS, More Fragment, Power Management, More Data, Protected Frame, End of Service Period, Relayed Frame, and Ack Policy. For a description of each subfield of the Frame Control field, refer to the IEEE 802.11 standard specifications.

Meanwhile, the Type field is 3 bits in the Frame Control field of the MAC header, with value 0 to value 3 providing address information and value 4 to value 7 being reserved. New address information may be provided using the reserved values in the present invention, which will be described later.

In the Frame Control field of the MAC header, the From DS field may be 1 bit.

Each of the More Fragment, Power Management, More Data, Protected Frame, End of Service Period, Relayed Frame, and Ack Policy fields may be 1 bit. The Ack Policy field may provide ACKnowledgement/Negative ACKnowledgement (ACK/NACK) information in 1 bit.

Regarding STAs using a frame constructed in the above-described format, an AP VHT STA may support a non-AP VHT STA operating in a Transmit Opportunity (TXOP) power save mode in a BSS. For example, the non-AP VHT STA may operate in the TXOP power save mode in the active state. The AP VHT STA may switch the non-AP VHT STA to the doze state during a TXOP. For example, the AP VHT STA may command the non-AP VHT STA to switch to the doze state by transmitting a VHT PPDU with a TXVECTOR parameter, TXOP_PS_NOT_ALLOWED set to 0. Parameters in TXVECTOR transmitted along with the VHT PPDU by the AP VHT STA may be changed from 1 to 0 and maintained during the TXOP. Therefore, power may be saved during the remaining TXOP.

On the contrary, if TXOP_PS_NOT_ALLOWED is set to 1 and thus power saving is not performed, the parameters in TXVECTOR may be kept unchanged.

For example, as described before, the non-AP VHT STA may switch to the doze state in the TXOP power save mode during a TXOP, if the following conditions are satisfied.

- A VHT MU PPDU is received, and the STA is not indicated as a group member by an RXVECTOR parameter, Group_ID.
- An SU PPDU is received, and an RXVECTOR parameter, PARTIAL_AID is not 0 or does not match the partial AID of the STA.
- Although the STA determines that the RXVECTOR parameter, PARTIAL_AID matches the partial AID of the STA, the Receiver Address (RA) of the MAC header does not match the MAC address of the STA.
- Although the RXVECTOR parameter, Group_ID indicates that the STA is a group member, an RXVECTOR parameter, NUM_STS is set to 0.
- A VHT NDP Announcement frame is received, and the RXVECTOR parameter, PARTIAL_AID is set to 0 and does not match the AID of an Info field for the STA.
- The STA receives a frame with More Data set to 0 and Ack Policy set to No Ack, or transmits an ACK with Ack Policy set to a value other than No Ack.

The AP VHT STA may include a Duration/ID value set to the remaining TXOP interval and a NAV-SET Sequence (e.g., Ready To Send/Clear To Send (RTS/CTS)). Herein, the AP VHT STA may not transmit a frame to a non-AP VHT STA switching to the doze state based on the above-described conditions during the remaining TXOP.

For example, if the AP VHT STA transmits a VHT PPDU with the TXVECTOR parameter, TXOP_PS_NOT_ALLOWED set to 0 in the same TXOP and does not want the STA to switch from the awake state to the doze state, the AP VHT STA may not transmit a VHT SU PPDU.

For example, the AP VHT STA may not transmit a frame to a VHT STA that has switched to the doze state before timeout of a NAV set at the start of a TXOP.

If the AP VHT STA fails to receive an ACK after transmitting a frame including at least one of a MAC Service Data Unit (MSDU), an Aggregated-MSDU (A-MSDU), and a MAC Management Protocol Data Unit (MMPDU), with More Data set to 0, the AP VHT STA may retransmit the frame at least once in the same TXOP. For example, if the AP VHT STA fails to receive an ACK for a retransmission in the last frame of the same TXOP, the AP VHT STA may retransmit the frame after waiting until the next TXOP.

For example, the AP VHT STA may receive a Block Ack frame from a VHT STA operating in the TXOP power save mode. The Block Ack frame may be a response to an A-MPDU including an MPDU with More Data set to 0. Herein, the AP VHT STA is in the doze state and may not receive a response to the sub-sequence of a retransmitted MPDU during the same TXOP.

Further, a VHT STA that has operated in the TXOP power save mode and switched to the doze state may activate a NAV timer while it stays in the doze state. For example, upon expiration of the timer, the VHT STA may transition to the awake state.

Further, the STA may contend for medium access, upon expiration of the NAV timer.

Now, a detailed description will be given of a method for performing random access based on OFDMA in a WLAN system, based on the above description.

Random Access in 11ax System

In a 3GPP cellular system, a UE performs random access to transmit a UL signal, with no resources allocated by an eNB. In contrast, a WLAN system does not need random access much, compared to the cellular system, because a frame is transmitted in a contention-based manner between an AP and an STA or between STAs.

However, as MU and OFDMA are supported for simultaneous signal transmissions between one AP and a plurality of STAs, random access is required to enable an STA having no resources to transmit a frame to an AP.

Figure 18:
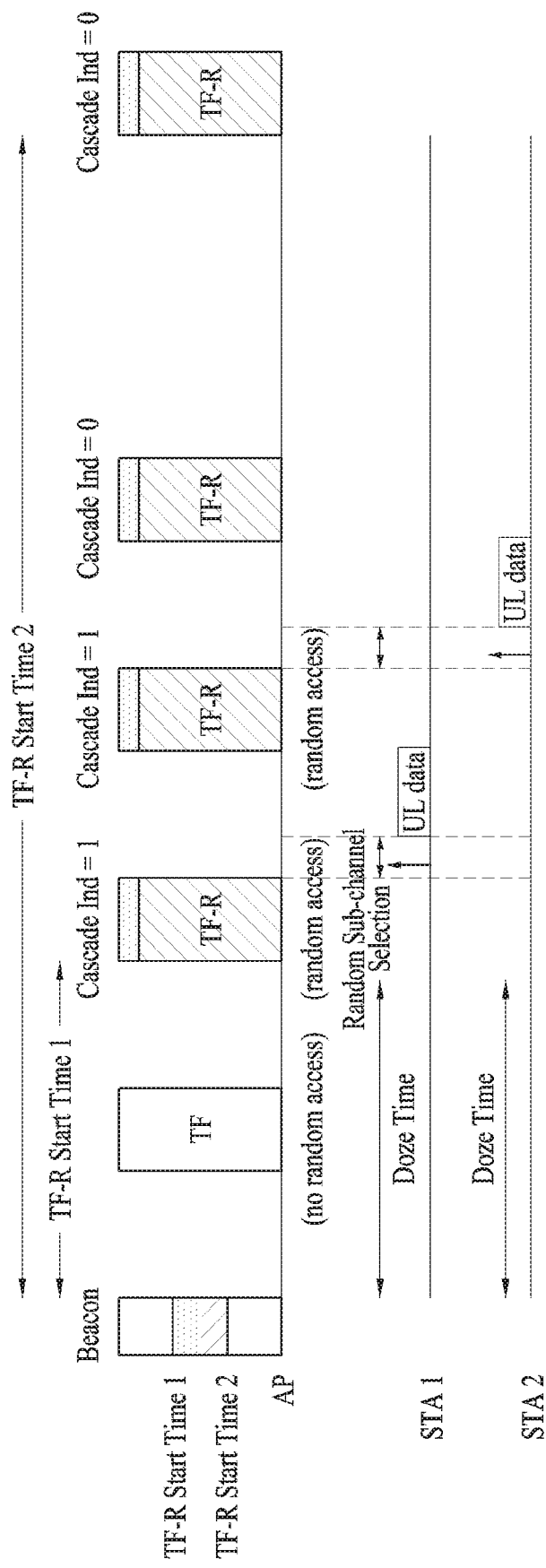
FIG. 18 is a view illustrating a random access method in a WLAN system according to an embodiment of the present invention.

FIG. 18 is a view illustrating a random access method in a WLAN system according to an embodiment of the present invention.

To allocate resources for random access to STAs, an afore-mentioned beacon frame and a trigger frame may be used for efficient random access in a WLAN system. According to an embodiment of the present invention, random access resources are allocated to an STA by a Trigger Frame for Random Access (TF-R), and information about transmission times of one or more TF-Rs is transmitted by a beacon frame.

As illustrated in FIG. 18, an AP may include TF-R transmission start information (e.g., TF-R Start Timer 1 and TF-R Start Timer 2) in a beacon frame. If random access resources are allocated to STA 1 and STA 2 by a TF-R transmitted at a time point indicated by TF-R Start Time 1 in FIG. 18, STA 1 and STA 2 preferably operate in the doze state until the time point indicated by TF-R Start Time 1, thereby minimizing power consumption.

Meanwhile, it is proposed that each of a plurality of TF-Rs illustrated in FIG. 18 includes a 1-bit cascade indicator indicating whether the TF-Rs are cascaded. It may occur that it is difficult to allocate random access resources with one TF-R, and an embodiment of the present invention proposes that random access resource allocation through a plurality of TF-Rs is supported by means of the cascade indicator.

Upon receipt of a TF-R, the STAs may select random resources from the random access resources allocated by the TF-R information, and transmit a random access request message in a UL data frame using the selected resources.

Meanwhile, a back-off procedure may be defined to reduce a collision probability in the case where STA 1 or STA 2 randomly selects random access resources and transmits a UL frame. In an embodiment of the present invention, the back-off procedure may be defined as OFDMA Back-Off (OBO) or simply Back-Off (BO).

Figure 19:
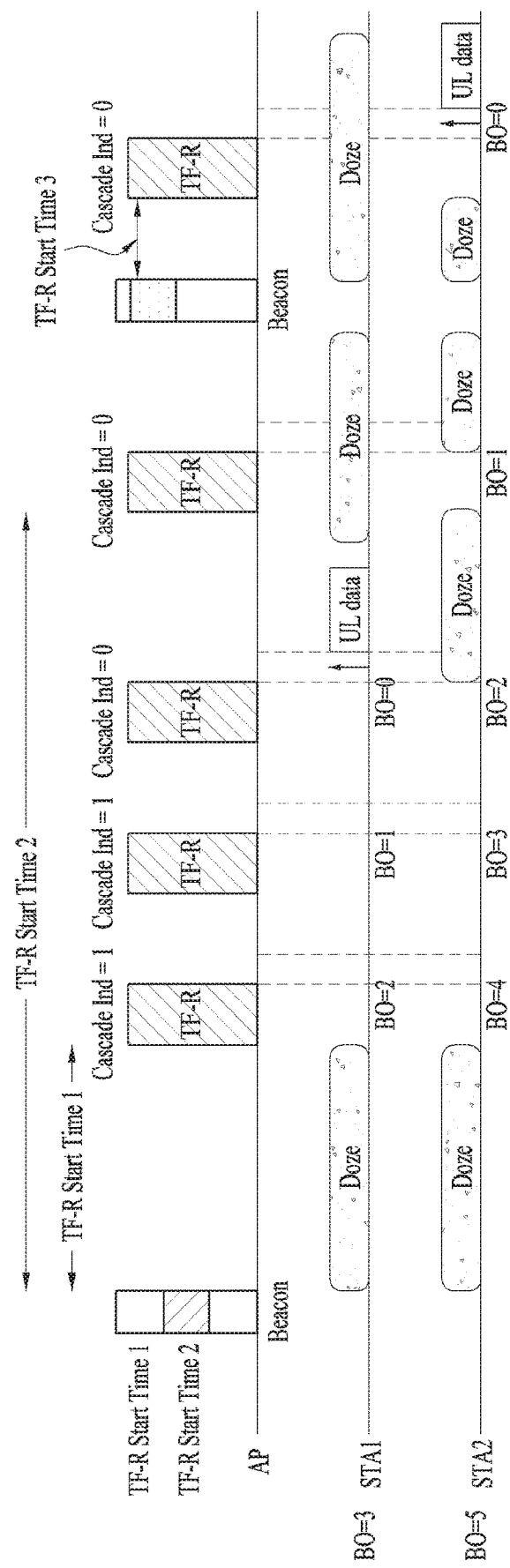
FIG. 19 is a view illustrating a method for performing random access based on Orthogonal Frequency Division Multiple Access (OFDMA) Back-Off (OBO) according to an embodiment of the present invention.

FIG. 19 is a diagram illustrating a method for performing random access based on OBO according to an embodiment of the present invention.

As illustrated in FIG. 19, each STA may select a value randomly within a specific window and set the selected value as an OBO value. In the embodiment, the window used for the OBO operation is defined as an OFDMA Contention Window (CWO). In the example of FIG. 19, STA 1 sets 3 as a BO value, and STA 2 sets 5 as a BO value. These BO (OBO) values are selected randomly from the range of a predetermined CWO. An AP may transmit information needed for CWO value setting of each STA in a beacon frame or its equivalent frame.

In an embodiment of the present invention, it is proposed that STAs decrement their OBO (BO) values, each time by a random access resource allocation unit, and if the OBO (BO) value of an STA reaches 0, the STA transmits a UL frame in resources selected randomly from among random access resources allocated to the STA. While each TF-R transmission unit is assumed to be one random access resource unit in the example of FIG. 19, there is no need for limiting the random access resource unit to a TF-R transmission unit.

In other words, STA 1 and STA 2 decrement their OBO values by 1 every TF-R reception unit (every random access resource allocation unit) in the example of FIG. 19. STA 1 may transmit UL data after three random access resource units because it has started back-off with a BO of 3, and STA 2 may transmit UL data after five random access resource units because it has started back-off with a BO of 5.

Meanwhile, it is preferred that an STA receiving a TF-R with a cascade indicator set to 1 does not operate in the doze state until receiving a TF-R with a cascade indicator set to 0. On the other hand, an STA receiving a TF-R with a cascade indicator set to 0 may enter the doze state until another TF-R reception time.

In the foregoing embodiment, STAs perform back-off countdown, while continuously receiving TF-Rs according to their selected OBO values. However, if an STA selects a large OBO value and monitors TF-Rs continuously during one or more beacon intervals, like STA 2 in FIG. 19, efficiency may be decreased in terms of power consumption of the STA.

In this context, a preferred embodiment of the present invention proposes that an AP indicates the number of random access resource units in a corresponding beacon interval to each STA by a beacon frame, and if its OBO value is larger than the number of random access resource units in the beacon interval, the STA operates in the doze state during the beacon interval. Preferably, the STA may decrement its OBO value by the number of random access resource units in the beacon interval and perform a back-off procedure in another beacon interval.

Figure 20:
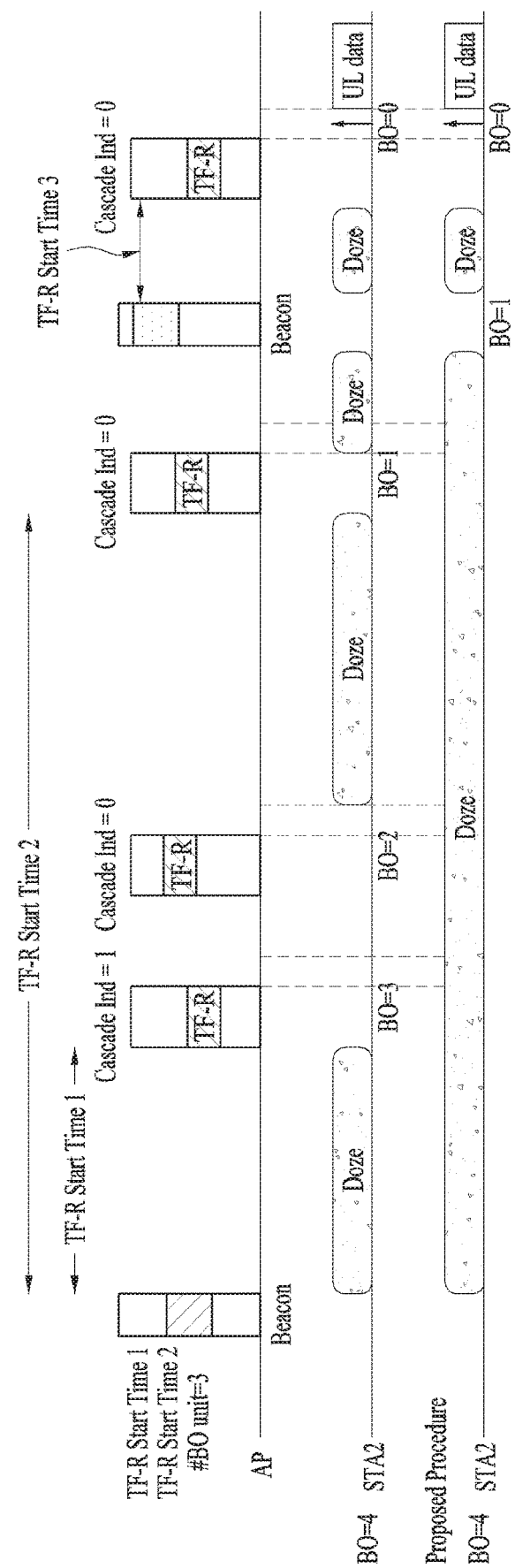
FIG. 20 is a view illustrating a method for indicating the number of random access resource units in a beacon interval by a beacon frame according to a preferred embodiment of the present invention.

FIG. 20 is a view illustrating a method for indicating the number of random access resource units in a corresponding beacon interval by a beacon frame according to a preferred embodiment of the present invention.

In FIG. 20, a case in which with a selected BO of 4, STA 2 operates in the doze state during a beacon interval in the above-described method is compared with a case in which with a selected BO of 4, STA 2 does not operate in the doze state during a beacon interval.

In a general back-off method, with a BO of 4, STA 2 operates in the doze state until a time point indicated by TF-R Start Time 1 and then receives TF-Rs. STA 2 decrements the BO value by 1 every random access resource unit, and finally transmits a UL frame after four random access resource units.

On the other hand, if STA 2, which uses information about the number of random access units in a corresponding beacon interval, included in a beacon frame according to a preferred embodiment of the present invention, determines that the number of random access resource units in the beacon interval is less than the BO value, STA 2 may operate in the doze state until receiving another beacon frame.

Further, STA 2 preferably decrements its OB value to 1 (=4−3) to operate in the doze state until another beacon interval.

Meanwhile, another preferred embodiment of the present invention proposes that the first of one or more TF-Rs provides information about the number of random access resource units in a corresponding beacon interval, instead of a beacon frame.

Figure 21:
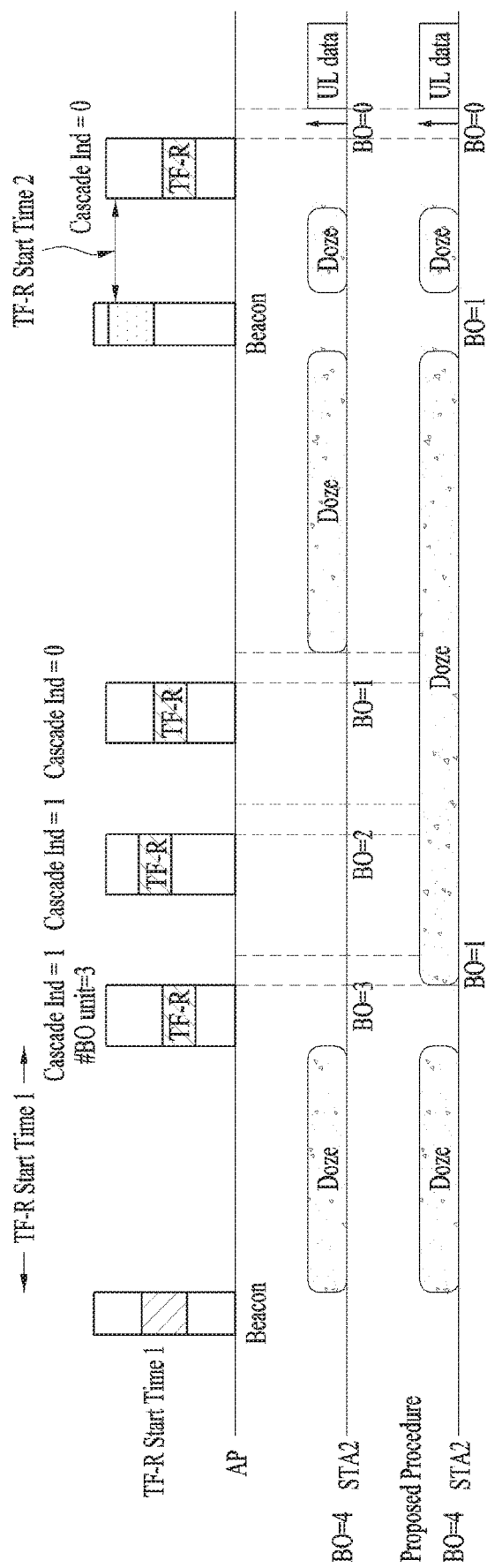
FIG. 21 is a view illustrating a method for indicating the number of random access resources units by a first Trigger Frame for Random access (TF-R) according to a preferred embodiment of the present invention.

FIG. 21 is a view illustrating a method for providing information about the number of random access resource units by a first TF-R according to a preferred embodiment of the present invention.

In FIG. 21, a case in which with a selected BO of 4, STA 2 uses the number of random access resource units is compared with a case in which a selected BO of 4, STA 2 does not use the number of random access resource units.

As is the case with FIG. 20, if STA 2 does not use information about the number of random access resource units, STA 2 may receive each TF-R and decrement its BO value by 1 each time. On the other hand, STA 2, which uses information about the number of random access units, included in a first TF-R according to an embodiment of the present invention, operates in the doze state from a corresponding time to the next beacon reception time, and control its OB value accordingly.

While it has been described above that a random access resource allocation unit corresponds to one TF-R interval in the foregoing embodiments, a plurality of random access resource units may be allocated by one TF-R. If a plurality of random access resource units are allocated by one TF-R, each STA may decrement its OBO (OB) value by the number of random access resource units allocated to the STA, which will be described later with reference to FIG. 21.

Meanwhile, an AP may restrict STAs which may transmit UL frames in resources for UL OFDMA random access in order to reduce a collision probability during UL OFDMA random access of STAs. For example, the AP may allow an STA with an odd-numbered AID to transmit a signal in resources for UL OFDMA random access allocated by a specific trigger frame, and an STA with an even-numbered AID to transmit a signal in resources for UL OFDMA random access allocated by another trigger frame. In another example, the AP may allow only STAs having Received Signal Strength Indicator (RSSI) values equal to or larger than a predetermined value to transmit a signal in random resources for UL OFDMA random access. The AP may transmit information corresponding to these conditions in a trigger frame or a beacon frame.

In addition, the AP may transmit information about the number of back-off units for random access (e.g., TF-Rs, slots, or random access resource units) in a current beacon interval or cascaded TF-Rs by a beacon frame or a TF-R (the first of the cascaded TF-Rs) in order to save power of STAs performing UL OFDMA random access. Herein, the AP may need to indicate, by the beacon frame or the first of the cascaded TF-Rs, whether information for restricting access of the STAs performing UL OFDMA random access in the cascaded TF-Rs is transmitted.

For example, if the AP indicates no STA access restriction by a beacon frame, an STA receiving the beacon frame may compare its back-off count with the number of BO units supposed to be transmitted during a current Target Beacon Transmission Time (TBTT) (the number of BO units may be indicated in the beacon frame by the AP). If the back-off count is larger than the number of BO units, the STA may maintain the doze mode until the next TBTT (herein, the STA decrements its back-off count by the number of BO units to be transmitted during the current beacon interval). Otherwise, the STA performs random access, maintaining the awake mode.

In another example, if the AP transmits information indicating no STA access restriction by the first of cascaded TF-Rs, upon receipt of the information, an STA may compare its back-off count with the number of BO units to be transmitted during the current cascaded TF-Rs. If the back-off count is larger than the number of BO units to be transmitted during the current cascaded TF-Rs, the STA indicates a target transmission time by a beacon and then maintain the doze mode until the next trigger frame (or the first of the next cascaded TF-Rs) (herein, the STA decrements its back-off count by the number of BO units to be transmitted during the current beacon interval). Otherwise, the STA performs random access, maintaining the awake mode.

Or in the case where the AP allocates resources for UL OFDMA random access by a TF or a TF-R, if the AP allocates multiple slots in time, STAs receiving the TF or TF-R may determine the number of back-off units for random access (e.g., TF-Rs or random access resource units) in the multiple slots allocated by the TF or the TF-R, and save power during the multiple slots by comparing the number of back-off units for random access with their back-off counts.

While the above description is given in the context of allocation of random access resources in multiple slots by a TF-R, this is done for the convenience. Thus, the above-described power save procedure may be applied in a similar manner to a case where a single slot is allocated.

Figure 22:
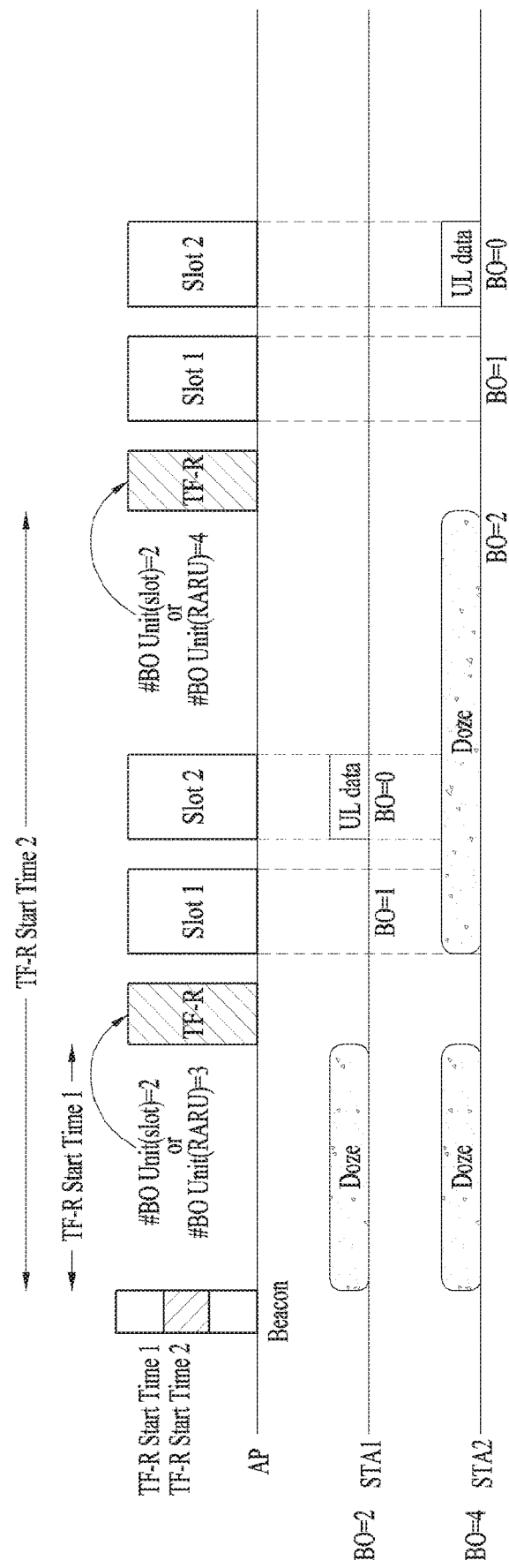
FIG. 22 is a view illustrating a method for performing a back-off procedure according to a resource unit allocated on an STA basis according to an embodiment of the present invention.

FIG. 22 is a view illustrating a method for performing a back-off procedure according to resource units allocated on an STA basis according to an embodiment of the present invention.

Specifically, FIG. 22 is based on the assumption that random access is performed using multiple slots indicated by a TF-R. For example, if BO values is 2 and 4, respectively for STA 1 and STA 2, STA 1 and STA 2 may switch from the doze state to the awake state and receive a TF-R at a TF-R target transmission time indicated by a beacon frame. Herein, STA 1 and STA 2 may determine the number of back-off units allocated by the TF-R based on information transmitted in the TF-R (e.g., the number of multiple slots or the number of Random Access-Resource Units (RA-RUs): this information may be indicated explicitly (by a common field or the like) or may be known from information about resources allocated for random access by the AP), and determine whether they may occupy a channel by random access, based on the determined number of back-off units. That is, an STA may determine whether a BO value is decremented to 0 and thus a UL frame may be transmitted.

For example, if STA 1 and STA 2 are capable of determining that the number of back-off units for resources allocated by a TF-R by receiving the TF-R, they may compare their back-off counts with the number of resource back-off units allocated by the TF-R. If its back-off count is larger than the number of resource back-off units allocated by the TF-R, an STA may transition to the doze state and maintain the doze state until the target transmission time of the next TF-R. That is, the STA may switch to the awake mode at the next TF-R target transmission time and receive the next TF-R. Preferably, the STA decrements its back-off count by the number of back-off units (e.g., the number of slots or random access resource units) known from the TF-R received in the previous operation.

In another example, if its back-off count is equal to or smaller than the number of resource back-off units allocated by the TF-R, the STA may perform random access, maintaining the awake mode.

In the case where the AP indicates restriction of access of STAs performing UL OFDMA random access through a trigger frame by an indication transmitted in a beacon frame or a TF-R (the first of cascaded TF-Rs), even though its back-off count is larger than the number of back-off units transmitted in a current beacon interval or the cascaded TF-Rs, the STA may maintain the awake mode, without saving power.

Or if the AP restricts UL OFDMA random access of STAs in a beacon frame or trigger frame by a beacon frame or a TF-R (the first of cascaded TF-Rs), the AP may indicate the number of back-off units according to each restriction condition. For example, if UL OFDMA random access of STAs is restricted according to odd and even numbers, the AP may indicate the number of back-off units transmitted in a current beacon interval or TF-R interval, for each case. Or the AP may indicate the number of back-off units for each group ID. In this case, the STA may determine whether to perform a power save procedure according to a predefined back-off rule. If the STA performs the power save procedure only with back-off units satisfying the back-off rule, the STA may perform the foregoing operation by comparing the number of the back-off units with its back-off count. Or if the STA follows the back-off rule unconditionally, the STA may compare the sum of the indicated numbers of back-off units for the respective conditions with its back-off count, and perform the afore-mentioned power save procedure irrespective of odd/even numbers.

A detailed description will be given of a back-off rule for STAs, when an AP restricts random access of STAs performing UL OFDMA random access.

Figure 23:
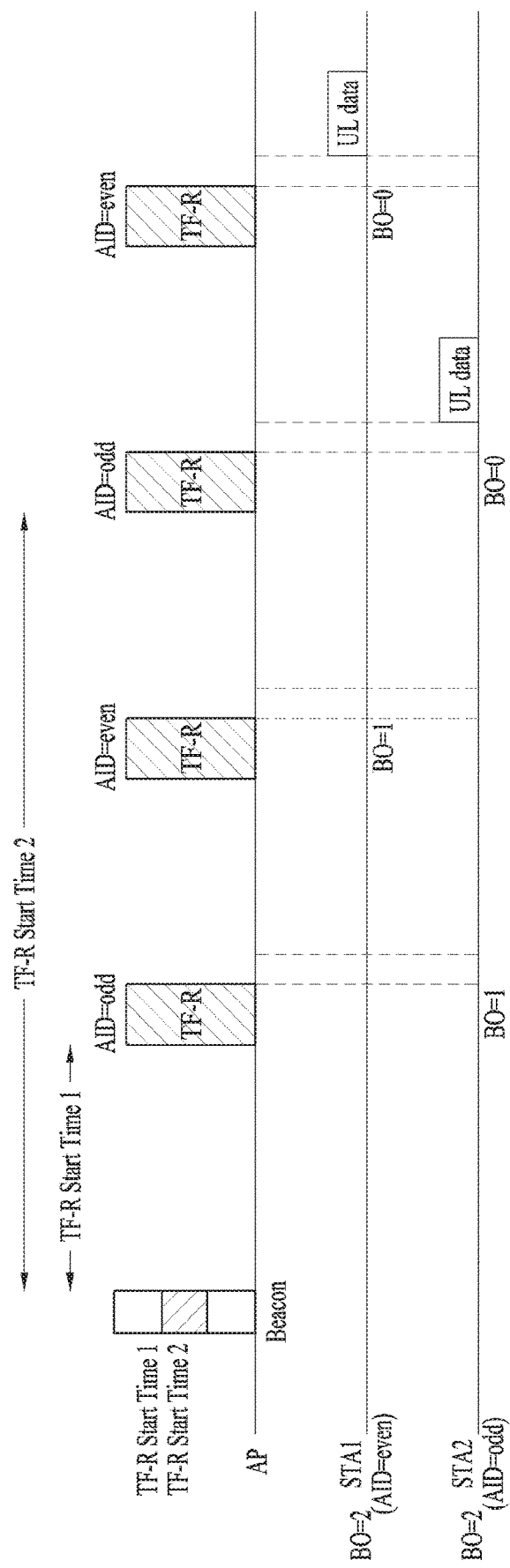
FIGS. 23, 24, and 25 are views illustrating various methods for restricting random access of STAs by an Access Point (AP) according to an embodiment of the present invention.
Figure 24:
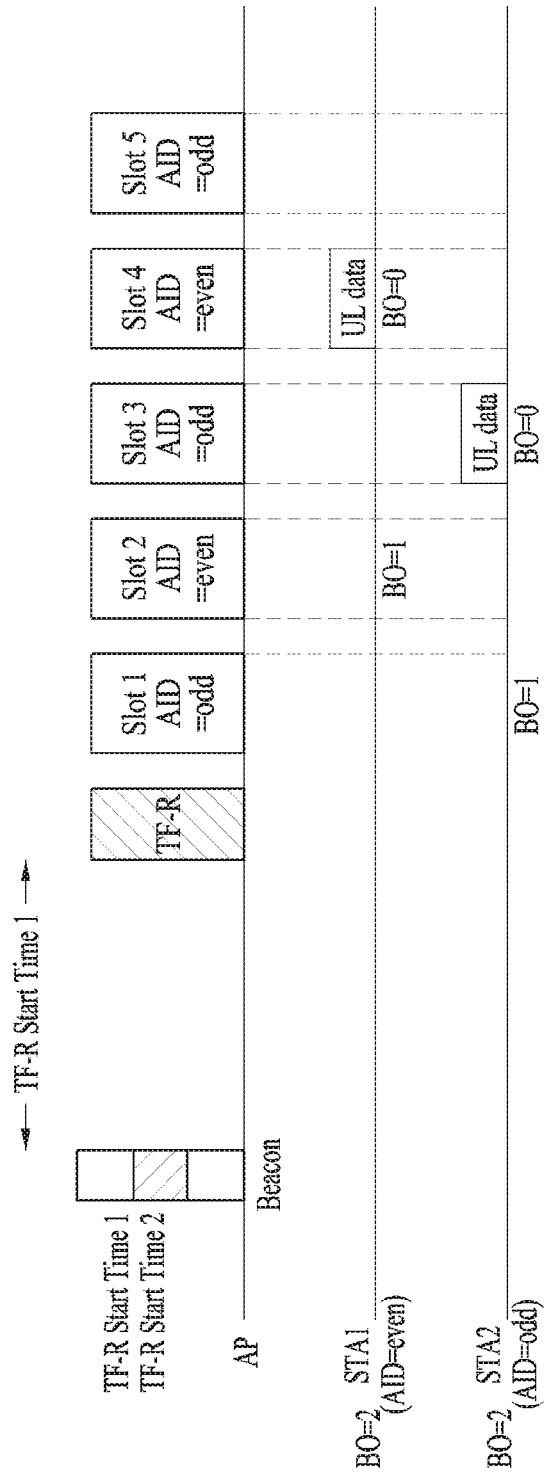
Figure 25:
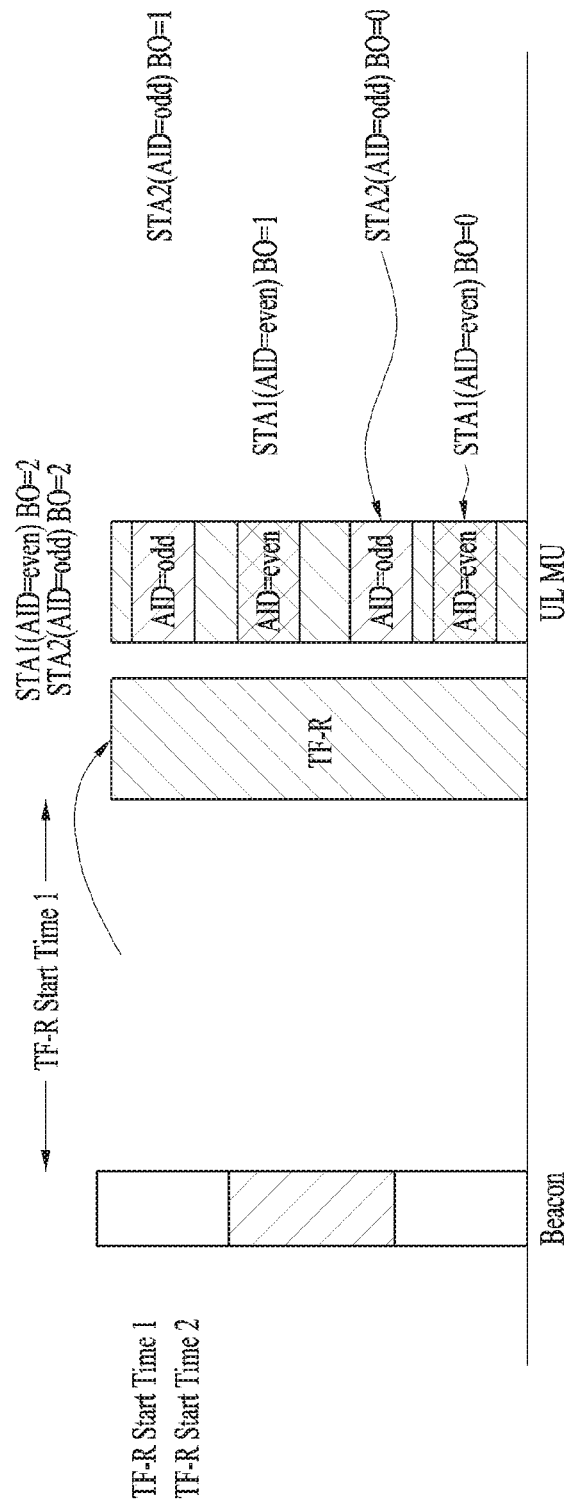

FIGS. 23, 24, and 25 are views illustrating various methods for restricting random access of STAs by an AP according to an embodiment of the present invention.

If the AP restricts UL OFDMA random access by a trigger frame or a beacon frame, an STA may decrement a back-off count by 1 every back-off unit for random access (e.g., every TF-R, slot, or random access resource unit), only if an access restriction condition indicated by the trigger frame is satisfied.

Subsequently, if a condition that allows the STA to perform random access, as indicated by the trigger frame or the beacon frame, is satisfied and its back-off count is 0, the STA selects resources randomly from resources allocated by the trigger frame and transmit a UL frame in the selected resources.

Specifically, FIG. 23 illustrates a case in which a back-off unit is a TF-R.

Referring to FIG. 23, STA 1 has an even-numbered AID, and STA 2 has an odd-numbered AID, by way of example. Each STA decrements a BO by 1 every TF-R corresponding to a back-off unit allocated to the STA, instead of every TF-R corresponding to a back-off unit.

FIG. 24 is a view illustrating a case in which a back-off unit is a slot.

Referring to FIG. 24, five slots are allocated by one TF-R. An odd-numbered slot is allocated to an STA having an odd-numbered AID, and an even-numbered slot is allocated to an STA having an even-numbered AID.

Accordingly, each of STA 1 and STA 2 may decrement a BO value by 1 every even-numbered or odd-numbered slot.

FIG. 25 is a view illustrating a case in which a back-off unit is a random access resource unit in the frequency domain.

That is, a plurality of random access resources in the frequency domain are allocated by one TF-R. A specific random access resource may be allocated to an STA having an even-numbered AID, and another specific random access resource may be allocated to an STA having an odd-numbered AID.

Therefore, each STA may decrement its BO value by the number of random access resource units allocated to the STA.

If the AP transmits information indicating the number of back-off units for random accesses (e.g., the number of TF-Rs, slots, or random access resource units) for each restriction condition, an STA receiving the information may compare its back-off count with the number of back-off units for a condition If the back-off count is larger than the number of back-off units, the STA may enter the doze state, and otherwise, the STA may transmit a UL frame, maintaining the awake state. When entering the doze state, the STA may decrement its back-off count by the number of back-off units for the condition, indicated by the AP.

Meanwhile, in another embodiment of the present invention, each STA may decrement a BO value even in a back-off unit in which resources are not allocated to the STA.

Figure 26:
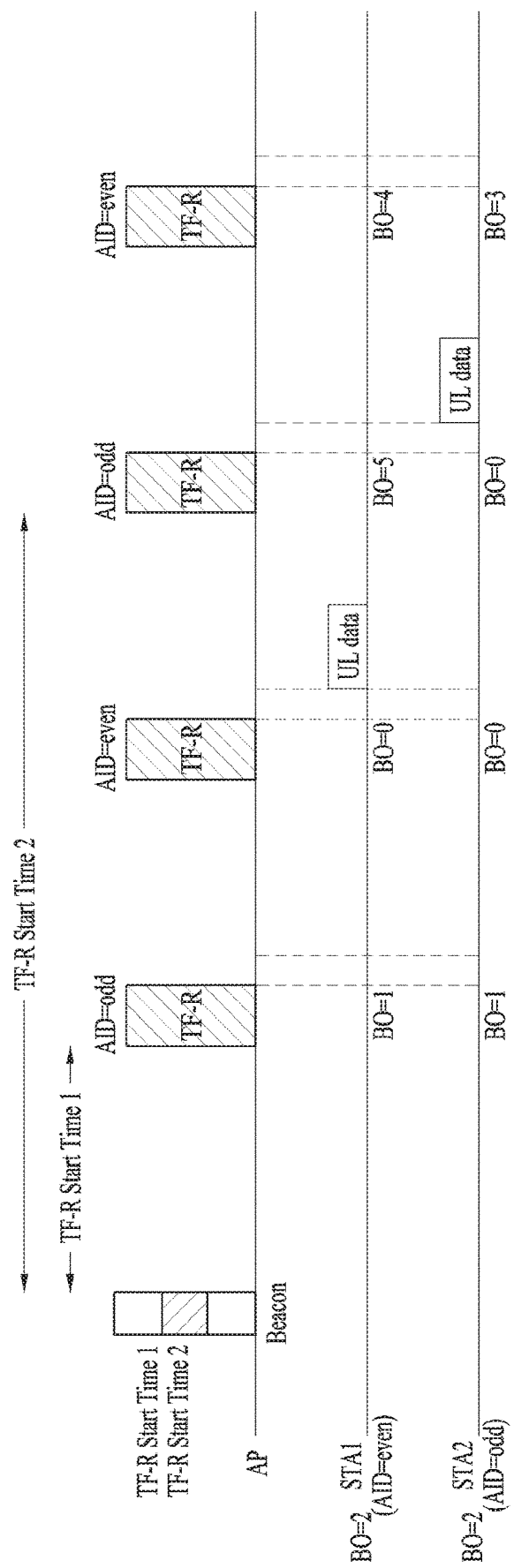
FIGS. 26, 27, and 28 are views illustrating methods for decrementing a Back-Off (BO) value every back-off unit according to another embodiment of the present invention.
Figure 27:
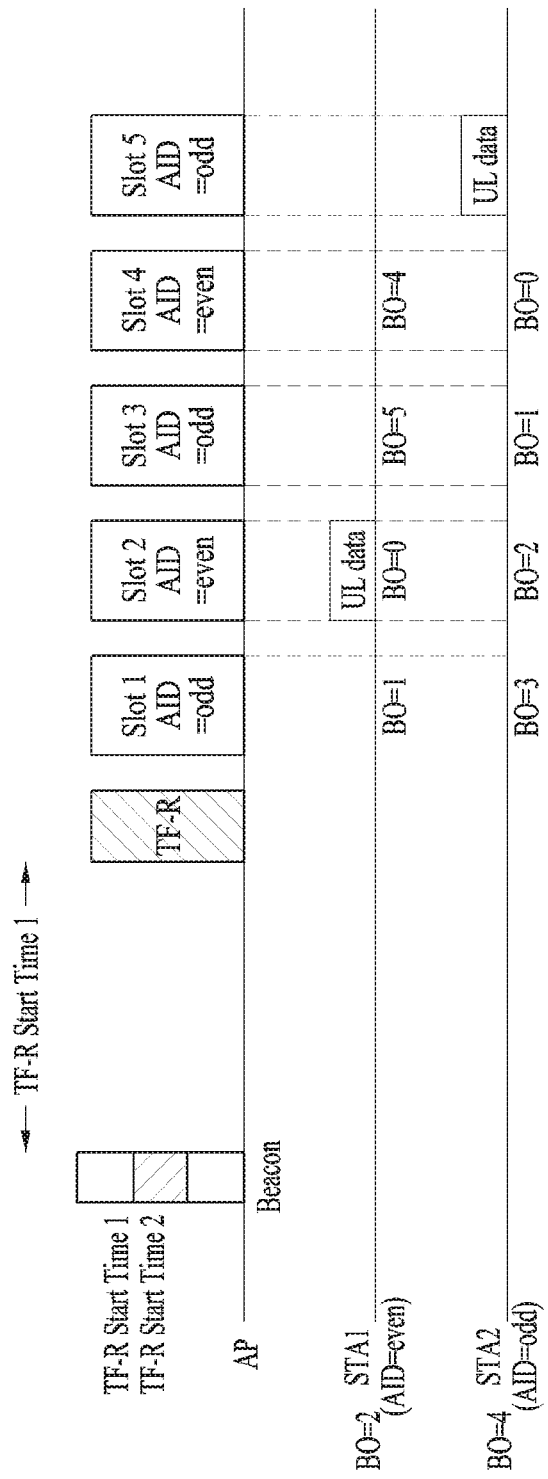
Figure 28:
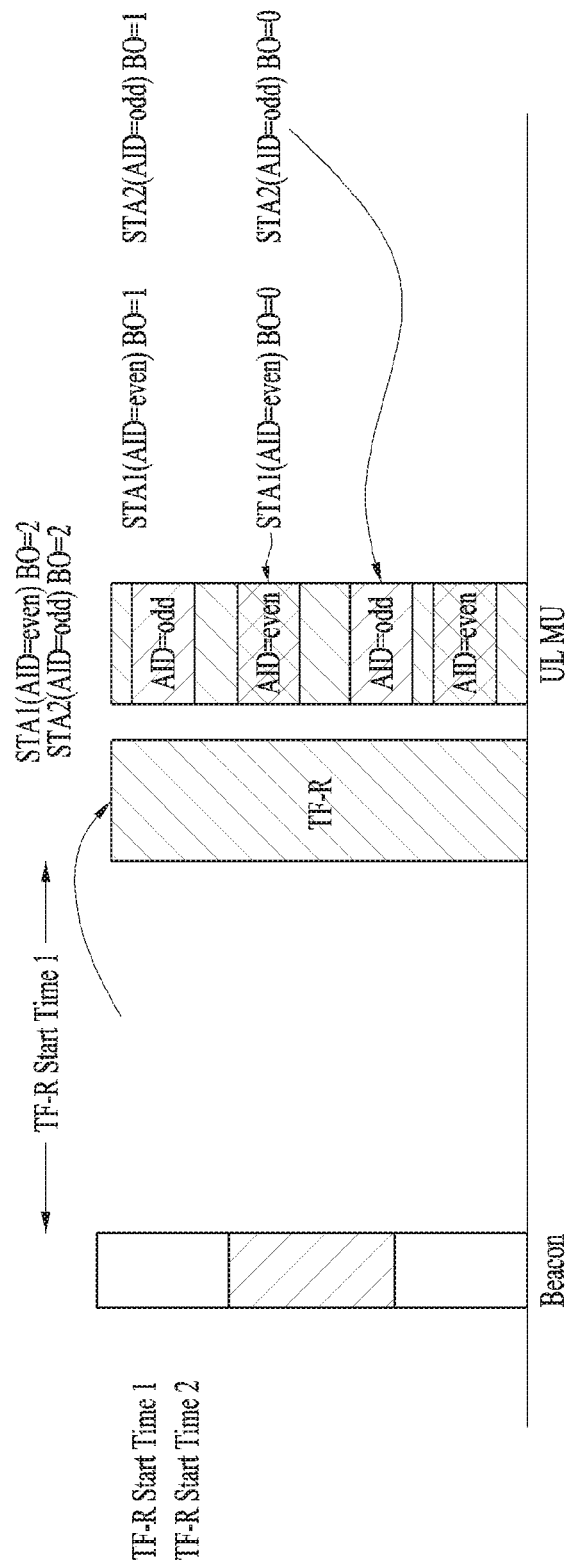

FIGS. 26, 27, and 28 are views illustrating methods for decrementing a BO value every back-off unit according to another embodiment of the present invention.

Specifically, FIG. 26 illustrates a case in which a back-off unit is a TF-R, FIG. 27 illustrates a case in which a back-off unit is a slot, and FIG. 28 illustrates a case in which a back-off unit is a random access resource unit.

If the AP transmits information indicating the number of back-off units for random access (e.g., the number of TF-Rs, slots, or random access resource units) for each restriction condition, an STA receiving the information may compare its back-off count with the number of back-off units for a condition. If the back-off count is larger than the number of back-off units, the STA may enter the doze state, and otherwise, the STA may transmit a UL frame, maintaining the awake state. When entering the doze state, the STA may decrement its back-off count by the number of back-off units for the condition, indicated by the AP.

In the case where the AP restricts UL OFDMA random access by a trigger frame or a beacon frame, the STA may also decrement the back-off count by 1 every back-off unit (e.g., every TF-R, slot, or random access resource unit) irrespective of whether the UL OFDMA random access restriction condition indicated by the AP is satisfied. In this case, if the condition is not satisfied although the back-off count is 0, the STA preferably maintains the back-off count to be 0 without transmitting a UL frame. Then, the STA may select a random value again from a range of [0 CWmin] after transmitting the UL frame.

The foregoing embodiments propose a method for saving more power for STAs by indicating the total number of Resource Units (RUs), for UL OFDMA random access. However, to implement this method, an AP should have prior knowledge of the number of RUs or calculate the number of RUs to indicate the total number of RUs by a beacon frame or a TF-R. If the AP is not capable of calculating or preliminarily determining the number of RUs, the AP should enable STAs to operate based on the existing cascade indication.

For this purpose, the situation in which an AP has no way to determine the total number of RUs is defined as unknown and indicated explicitly as follows in an embodiment of the present invention.

First, a total RU number information bit is set to 0. Since the total number of RUs is not indicated, this may be considered to indicate explicitly that an existing cascade indication is used.

2-bit total RU number information is provided. If this information is set to 0, this may indicate that the total number of RUs will be indicated. If this information is set to 255 (or a maximum value of the bits), this may indicate that the total number of RUs will not be indicated.

HE PPDU Format

While a frame structure for IEEE 802.11ax has not been specified yet, the following frame structure is expected.

Figure 29:
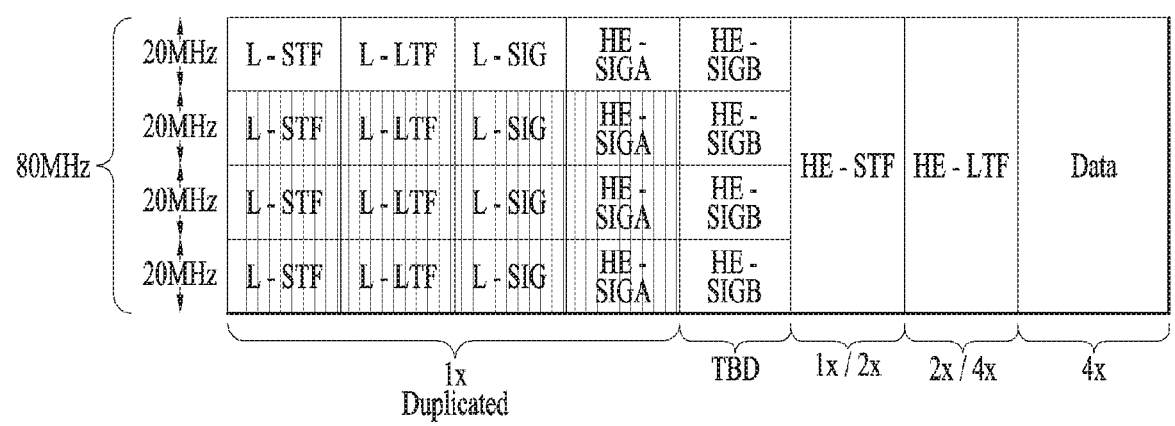
FIG. 29 is a view illustrating an exemplary High Efficiency (HE) Physical Layer Convergence Protocol (PLCP) Packet Data Unit (PPDU) format according to an embodiment of the present invention.

FIG. 29 is a view illustrating an exemplary High Efficiency (HE) PPDU format according to an embodiment of the present invention.

In IEEE 802.11ax, a legacy 1× symbol structure (3.2 μs) is adopted for a part of the frame up to HE-SIG-A, and a frame structure as illustrated in FIG. 29 may be used for the remaining part of the frame from HE-SIG-B, as illustrated in FIG. 29. As far as the following description is applicable, there is no problem with applying the present invention even though the above structure is changed.

An L-part may be configured as in a legacy Wireless Fidelity (WiFi) system, and thus may include L-STF, L-LTF, and L-SIG. Generally, L-SIG preferably provides packet length information.

A HE-part is a new part configured for the 11ax standard (High Efficiency). HE-SIG (HE-SIGA and HE-SIGB) may be interposed between the L-part and HE-STF, providing common control information and user-specific information. Specifically, HE-SIGA may provide common control information, and HE-SIGB may provide user-specific information. Although information of HE-SIG has not been defined yet in IEEE 802.11ax, HE-SIGA and HE-SIGB may include the following information.

[Table 1] below lists exemplary information that may be transmitted in HE-SIGA, and [Table 2] below lists exemplary information that may be transmitted in HE-SIGB.

TABLE 1

| Field | Description |
|---|---|
| Bandwidth | Indicating a bandwidth in which a PPDU is transmitted. For example, 20 MHz, 40 MHz, 80 MHz |
| Color bits | Indicating an BSS ID |
| MCS | Indicating the MCS of HE-SIGB |
| N_sym | Indicating the number of symbol for HE-SIG B |
| Guard Interval (GI) indication | Indicating the CP length of HE-SIGB (ex. 0.4, 0.8, 1.6, 2.4) |
| MU indication | Indicating whether a PPDU is an SU-MIMO PPDU or an MU-MIMO PPDU |

TABLE 2

| Field | Description |
|---|---|
| Partial AID | |
| MCS | Indicating the MCS of Data for each STA |
| Stream information | Indicating the number of spatial streams for each STA. |
| encoding | Indicating whether BCC or LDPC |
| beam formed | Indicating whether beam forming or not |

TABLE 2-continued

| Field | Description |
|---|---|
| Guard Interval (GI) indication | Indicating the CP length of Data for each STA |
| Allocation information | Indicating a resource block (subchannel index or subband index) allocated to each STA in a bandwidth in which a PPDU is transmitted |
| STBC | Space Time Block Coding |
| length | Indicating the length of HE PPDU is transmitted in a bandwidth |

Figure 30:
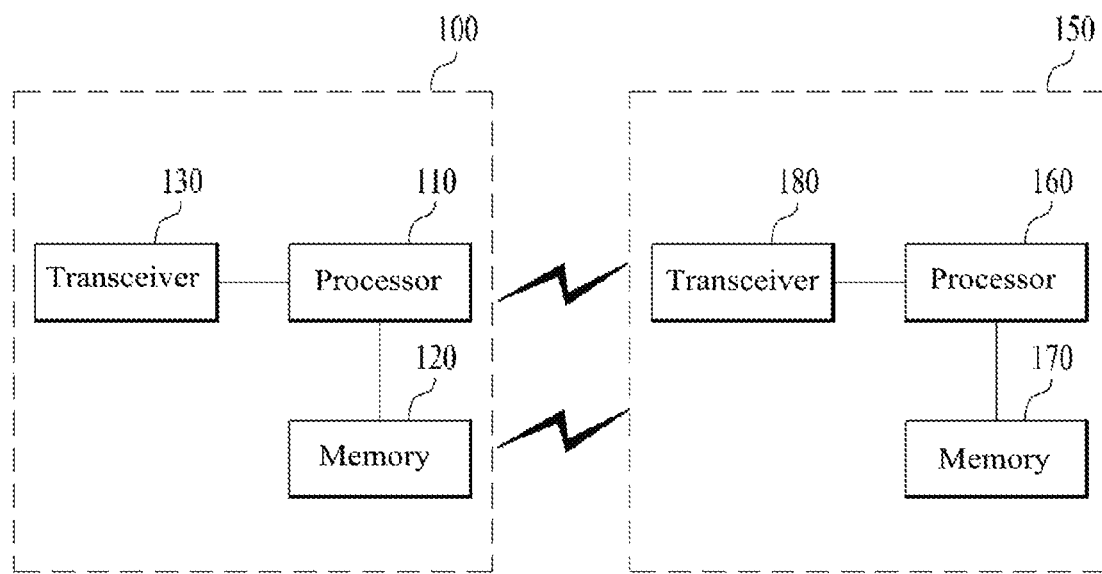
FIG. 30 is a block diagram illustrating exemplary configurations of an AP (or Base Station (BS)) and an STA (or User Equipment (UE)) according to an embodiment of the present invention.

FIG. 30 is a block diagram illustrating an exemplary structure of an AP (or BS) and an STA (or UE) according to an embodiment of the present invention.

An AP 100 may include a processor 110, a memory 120, and a transceiver 130. An STA 150 may include a processor 160, a memory 170, and a transceiver 180.

The transceivers 130 and 180 may transmit and receive wireless signals, for example, implement the Physical (PHY) layer in an IEEE 802 system. The processors 110 and 160 may be connected to the transceivers 130 and 180, and implement the PHY layer and/or the MAC layer in the IEEE 802 system. The processors 110 and 160 may be configured to perform one or a combination of two or more of the foregoing various embodiments of the present invention. Further, modules that perform AP and STA operations according to the foregoing various embodiments of the present invention may be stored in the memories 120 and 170 and executed by the processors 110 and 160. The memories 120 and 170 may be included inside the processors 110 and 160, or may be installed outside the processors 110 and 160 and connected to the processors 110 and 160 by known means.

The above descriptions of the AP 100 and the STA 150 are applicable to a BS and a UE, respectively in other wireless communication systems (e.g., an LTE/LTE-A system).

The above specific configurations of an AP and an STA may be implemented in such a manner that the various embodiments of the present invention may be implemented independently or simultaneously in a combination of two or more of them. Redundant descriptions will not be provided herein, for clarity.

Figure 31:
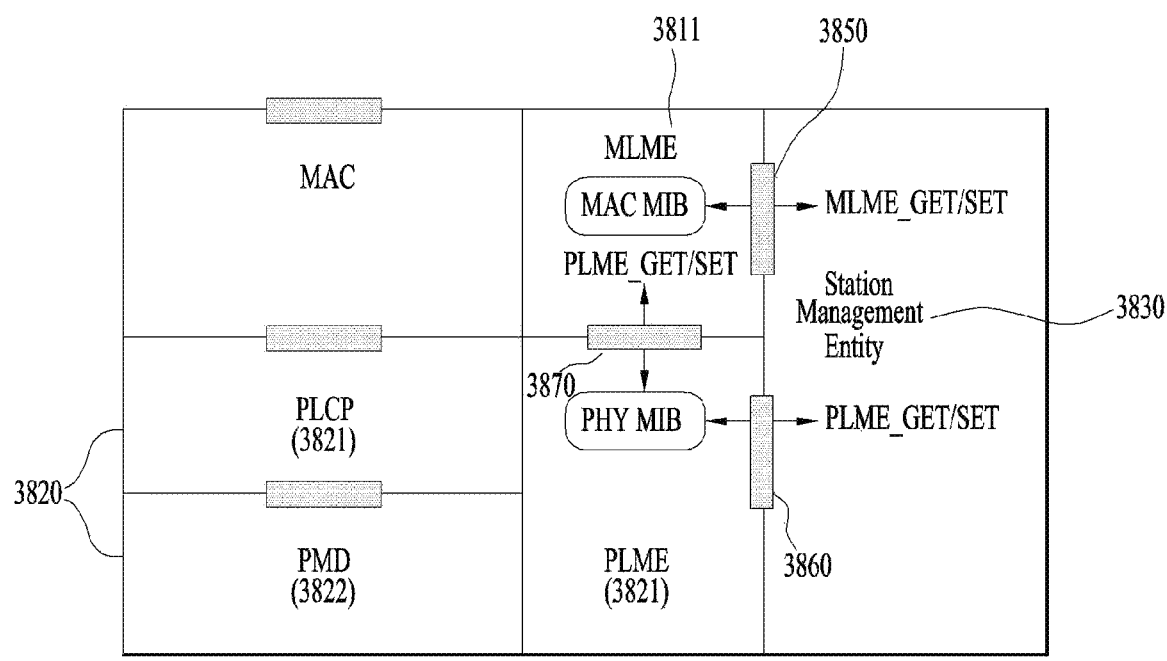
FIG. 31 is a view illustrating an exemplary structure of a processor in an AP or STA according to an embodiment of the present invention.

FIG. 31 is a view illustrating an exemplary structure of a processor in an AP or STA according to an embodiment of the present invention.

The processor of the AP or STA may have a multi-layered structure. FIG. 31 focuses on a MAC sublayer 3810 of a Data Link Layer (DLL) and a PHY layer 3820 among a plurality of layers. Referring to FIG. 31, the PHY layer 3820 may include a PLCP entity 3821, and a Physical Medium Dependent (PMD) entity 3822. Each of the MAC sublayer 3810 and the PHY layer 3820 includes a management entity conceptually called MAC sublayer Management Entity (MLME) 3811. These entities 3811 and 3821 provide layer management service interfaces through which layer management functions may be invoked.

In order to provide a correct MAC operation, a Station Management Entity (SME) 3830 is present in each STA. The SME 3830 is a layer-independent entity that may be viewed as residing in a separate management plane or as residing off to the side. The exact functions of the SME 3830 are not specified herein, but in general, this entity may be viewed as being responsible for such functions as gathering of information about layer-dependent statuses from various Layer Management Entities (LMEs) and similar setting of the values of layer-specific parameters. The SME 3830 may typically perform such functions on behalf of general system management entities and may implement standard management protocols.

The entities illustrated in FIG. 31 interact with one another in various ways. FIG. 31 illustrates a couple of examples of exchanging GET/SET primitives. An XX-GET.request primitive is used to request the value of a given Management Information Base (MIB) attribute. An XX-GET. confirm primitive returns an appropriate MIB attribute value if Status is set to "success" and otherwise, returns an error indication in a Status field. An XX-SET.request primitive is used to request that an indicated MIB attribute be set to a given value. If this MIB attribute implies a specific action, then this requests that the action be performed. An XX-SET.confirm primitive confirms that an indicated MIB attribute was set to a requested value, if Status is set to "success," and otherwise, it returns an error condition in the Status field. If this MIB attribute implies a specific action, then this confirms that the action was performed.

As illustrated in FIG. 31, the MLME 381 and the SME 3830 may exchange various MLME_GET/SET primitives via an MLME Service Access Point (MLME_SAP) 3850. Also, various PLCM_GET/SET primitives may be exchanged between the PLME 3821 and the SME 3830 via a PLME_SAP 3860 and between the MLME 3811 and the PLME 3870 via an MLME-PLME_SAP 3870.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, or the like.

In a firmware or software configuration, the method according to the embodiments of the present invention may be implemented in the form of modules, procedures, functions, or the like that perform the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein. While the preferred embodiments of the present disclosure have been illustrated and described, the present disclosure is not limited to the foregoing specific embodiments, and those skilled in the art can make various modifications within the scope and spirit of the present disclosure claimed in the appended claims. Further, these modified embodiments should not be understood individually from the technical spirit or perspective of the present disclosure.

Both a product invention and a process invention are described in the present disclosure, and the descriptions of the inventions may be applied complementarily, when needed.

INDUSTRIAL APPLICABILITY

As described before, the embodiments of the present invention are applicable to various wireless communication systems including an IEEE 802.11 system.

What is claimed is:

1. A method for performing uplink Orthogonal Frequency Division Multiple Access (UL OFDMA) based random access by a Station (STA) in a Wireless Local Area Network (WLAN) system, the method comprising:
    setting a random value within an OFDMA Contention Window (OCW) as an OFDMA Back-Off (OBO) value;
    receiving a beacon frame comprising information related to a start time of a time period to transmit at least one first Trigger Frame for Random Access (TF-R);
    after receiving the beacon frame, entering a doze state until the start time identified based on the information related to the start time;
    after the start time, transitioning to an awake state to receive the at least one first TF-R;
    receiving the at least one first TF-R,
    wherein the at least one first TF-R are respectively related to at least one first resource unit for random access;
    decrementing the OBO value based on a number of the at least one first resource unit;
    based on that the OBO value decrements to 0 according to decrementing the OBO value based on the number of the at least one first resource unit:
        randomly selecting a resource unit among the at least one first resource unit; and
        transmitting a frame based on the resource unit; and
    based on that the OBO value decrements to a nonzero value according to decrementing the OBO value based on the number of the at least one first resource unit:
        entering the doze state; and
        maintaining the decremented nonzero OBO value until at least one second TF-R related to at least one second resource unit for random access is received.

2. The method of claim 1, wherein the at least one first TF-R comprises a cascade indicator indicating whether the at least one first TF-R is cascaded.

3. The method of claim 1, wherein the at least one resource unit comprises at least one first resource unit and at least one second resource unit distinguished based on a value of an association identifier (AID) allocated to the STA,
    wherein based on that the AID with an odd value is allocated to the STA, the resource unit is selected among the at least one first resource unit, and
    wherein based on that the AID with an even value is allocated to the STA, the resource unit is selected among the at least one second resource unit.

4. A Station (STA) for performing uplink Orthogonal Frequency Division Multiple Access (UL OFDMA) based random access in a Wireless Local Area Network (WLAN) system, the STA comprising:
    a memory; and
    at least one processor coupled with the memory,
    wherein the at least one processor is configured to:
    set a random value within an OFDMA contention window (OCW) as an OFDMA back-off (OBO) value;
    receive a beacon frame comprising information related to a start time of a time period to transmit at least one first trigger frame for random access (TF-R);
    after receiving the beacon frame, enter a doze state until the start time identified based on the information related to the start time;
    after the start time, transition to an awake state to receive the at least one first TF-R;
    receive the at least one first TF-R,
    wherein the at least one first TF-R are respectively related to at least one first resource unit for random access;
    decrement the OBO value based on a number of the at least one first resource unit;
    based on that the OBO value decrements to 0 according to decrementing the OBO value based on the number of the at least one first resource unit:
        randomly select a resource unit among the at least one first resource unit; and
        transmit a frame based on the resource unit; and
    based on that the OBO value decrements to a nonzero value according to decrementing the OBO value based on the number of the at least one first resource unit:
        enter the doze state; and
        maintain the decremented nonzero OBO value until at least one second TF-R related to at least one second resource unit for random access is received.

* * * * *